United States Patent
Chikauchi

[19]

[11] Patent Number: 5,909,539
[45] Date of Patent: Jun. 1, 1999

[54] IMAGE GENERATING SYSTEM AND METHOD

[75] Inventor: Masami Chikauchi, Iruma, Japan

[73] Assignees: Casio Computer Co., Ltd.; Casio Electronics Manufacturing Co., Ltd., both of Tokyo, Japan

[21] Appl. No.: 08/714,223

[22] Filed: Sep. 16, 1996

[30] Foreign Application Priority Data

Sep. 20, 1995 [JP] Japan ..................................... 7-242064
Dec. 15, 1995 [JP] Japan ..................................... 7-326664

[51] Int. Cl.⁶ .............................. G06F 15/00; G06K 9/36
[52] U.S. Cl. ......................... 395/117; 395/112; 395/114; 382/176; 707/528
[58] Field of Search ................................. 395/102, 109, 395/114, 117, 101, 112; 345/435, 403; 382/176, 270, 271, 272, 273; 707/528

[56] References Cited

U.S. PATENT DOCUMENTS

| | | |
|---|---|---|
| 5,194,969 | 3/1993 | DiFrancesco . |
| 5,231,577 | 7/1993 | Koss . |
| 5,247,611 | 9/1993 | Norden-Paul et al. . |
| 5,339,392 | 8/1994 | Risberg et al. . |
| 5,471,612 | 11/1995 | Schlafly .................................... 395/600 |
| 5,638,192 | 6/1997 | Yoshida ................................... 358/530 |
| 5,715,382 | 2/1998 | Herregods et al. ..................... 395/117 |

FOREIGN PATENT DOCUMENTS

| | | |
|---|---|---|
| 0514101 A2 | 11/1992 | European Pat. Off. . |
| 0535987 A2 | 4/1993 | European Pat. Off. . |
| 0703524 A1 | 9/1994 | European Pat. Off. . |
| 0703524B1 | 9/1994 | European Pat. Off. . |
| 59-151273 | 8/1984 | Japan . |
| 63-288562 | 11/1988 | Japan . |
| 1-237143 | 9/1989 | Japan . |
| 2-34368 | 2/1990 | Japan . |
| 3-127226 | 5/1991 | Japan . |

OTHER PUBLICATIONS

LOTUS vol. 6, No. 6, Jun. 1990, pp. L13–L14 XP000610930 Ray, G., Color Your Spreadsheet: More Color For !–2–3.

PC World, vol. 124, No. 12, pp. 111–114, XP0002019900, Scoville, "I Didn't Know 1–2–3 Could Do That!", Dec. 1994.

Primary Examiner—Edward L. Coles
Assistant Examiner—Mark Wallerson
Attorney, Agent, or Firm—Frishauf, Holtz, Goodman, Langer & Chick

[57] ABSTRACT

Defining information for defining the condition for adding background colors is previously stored in a condition storage area, and a spreadsheet form is registered in a form storage area. Alphanumeric character data to be written in a cell of a spreadsheet are stored in a record storage area. When a CPU is instructed to start printing, the CPU outputs the alphanumeric character data as output data to a data value decision section. The data value decision section reads the output data and determines a background color in accordance with the read output data to prepare a print record to which color information is added. A printer control section prepares print data to which the background color is added in accordance with the color information for the print record and the spreadsheet form registered in the form storage area.

14 Claims, 28 Drawing Sheets

ITEMS FOR DECIDING BACKGROUND COLORS : △△△△

| RANGE | COLOR DATA (5 BITS) | GRADATION DATA (3 BITS) |
|-------|---------------------|-------------------------|
| X     | RED                 | 6                       |
| .     | RED                 | 3                       |
| .     | .                   | .                       |
| .     | .                   | .                       |
| .     | .                   | .                       |
| .     | .                   | .                       |

REFERENCE ITEMS:" RECEIPTS " IN "EXTENSION RATE"

| ADDRESS | RANGE OF NUMERIC | COLOR DATA | GRADATION DATA |
|---------|------------------|------------|----------------|
| $A_1$ | $0 \leq X < 50$ | RED | 6 |
| $A_2$ | $50 \leq X < 100$ | RED | 3 |
| $A_3$ | $100 \leq X < 150$ | RED | 1 |
| $A_4$ | $150 \leq X < 200$ | GREEN | 1 |
| $A_5$ | $200 \leq X < 250$ | GREEN | 3 |
| $A_6$ | $250 \leq X < 300$ | GREEN | 5 |
| $A_7$ | $300 \leq X$ | GREEN | 7 |

FIG.8

GOODS COMPOSITION TABLE

| NAME OF GOODS | RECEIPTS | GROSS RECEIPT | GROSS RECEIPT RATE % | COMPOSITION RATIO | | EXTENSION RATE | | |
|---|---|---|---|---|---|---|---|---|
| | | | | RECEIPTS | GROSS RECEIPT | RECEIPTS | GROSS RECEIPT | |
| GOODS A (01A00330) | 274,026 / 56,422 | 28,506 / 12,182 | 10.4% / 21.6% | 100.0% / 100.0% | 100.0% / 100.0% | 385.7% | 134.0% | GREEN 7 |
| GOODS B (01A00530) | 63,680 / 13,000 | 4,808 / 4,080 | 7.6% / 31.4% | 23.2% / 4.6% | 16.9% / 6.7% | 234.9% | 489.2% | GREEN 3 |
| GOODS C (01A00630) | 24,260 / 6,200 | 3,052 / 1,632 | 12.6% / 26.3% | 8.9% / 11.0% | 10.7% / 13.4% | 291.3% | 87.0% | GREEN 5 |
| GOODS D (01A10810) | 18,792 / 9,720 | 2,520 / 1,584 | 13.4% / 16.3% | 6.9% / 17.2% | 8.8% / 13.0% | 93.3% | 59.1% | RED 3 |
| GOODS E (01P00900) | 29,640 / 13,680 | 4,680 / 2,160 | 15.8% / 15.8% | 10.8% / 24.2% | 16.4% / 17.7% | 116.7% | 116.7% | RED 1 |
| GOODS F (02101420) | 6,901 / 903 | 181 / 63 | 2.6% / 7.0% | 2.5% / 1.6% | 0.6% / 0.5% | 664.2% | 187.3% | GREEN 7 |
| TOTAL | 274,026 / 56,422 | 28,506 / 12,182 | 10.4% / 21.6% | 100.0% / 100.0% | 100.0% / 100.0% | 385.7% | 134.0% | GREEN 7 |

REFERENCE ITEMS

FIG.11

| (A×B) | COLOR | GRADATIONS |
|---|---|---|
| 100 ~ | BLUE | 3 |
| 95 ~ | BLUE | 2 |
| 90 ~ | BLUE | 1 |
| 85 ~ | GREEN | 1 |
| 80 ~ | GREEN | 2 |
| 75 ~ | RED | 1 |
| 70 ~ | RED | 2 |
| ~70 | RED | 3 |

| | NUMERIC RANGE | COLOR | GRADATIONS | |
|---|---|---|---|---|
| 0 | = X | YELLOW | 2 | |
| 0 | < X < 10 | GREEN | 1 | LIGHTER |
| 10 | ≦ X < 20 | GREEN | 2 | ↑ |
| 20 | ≦ X < 30 | GREEN | 3 | |
| 30 | ≦ X < 40 | GREEN | 4 | ↓ |
| 40 | ≦ X < 70 | GREEN | 5 | DARKER |
| 70 | ≦ X < 100 | GREEN | 6 | |

WEEKLY PROFIT SHIFT TABLE FOR GOODS

| NAME OF GOODS | NAME OF ITEM | APRIL 1 | APRIL 8 | APRIL 15 | APRIL 22 | APRIL 29 |
|---|---|---|---|---|---|---|
| GOODS A (01A00330) | PROCEEDS GROSS MARGIN RATE | YELLOW 2 0.0% | YELLOW 2 0.0% | GREEN 10 7 94.3% | YELLOW 2 0.0% | GREEN 4 4 36.1% |
| GOODS B (01A00530) | PROCEEDS GROSS MARGIN RATE | GREEN 4 33.3% | YELLOW 2 0.0% | GREEN 10 51 90.5% | GREEN 2 2 19.9% | GREEN 4 7 33.3% |
| GOODS C (01A00630) | PROCEEDS GROSS MARGIN RATE | YELLOW 2 0.0% | YELLOW 2 0.0% | GREEN 4 1 35.0% | YELLOW 2 0.0% | GREEN 4 1 35.0% |
| GOODS D (01A10810) | PROCEEDS GROSS MARGIN RATE | YELLOW 2 0.0% | YELLOW 2 0.0% | GREEN 1 35 1.5% | YELLOW 2 0.0% | GREEN 4 3 32.3% |
| GOODS E (01P00900) | PROCEEDS GROSS MARGIN RATE | YELLOW 2 0.0% | GREEN 4 30.4% | GREEN 4 18 30.4% | YELLOW 2 0.0% | GREEN 4 9 30.4% |
| GOODS F (021O1420) | PROCEEDS GROSS MARGIN RATE | YELLOW 2 0.0% | GREEN 3 28.0% | GREEN 3 16 28.0% | GREEN 3 24 28.0% | GREEN 3 24 28.0% |
| TOTAL | PROCEEDS GROSS MARGIN RATE | GREEN 3 10 29.2% | GREEN 1 112 8.6% | GREEN 3 281 25.7% | GREEN 2 133 11.7% | GREEN 4 49 30.3% |

FIG.17

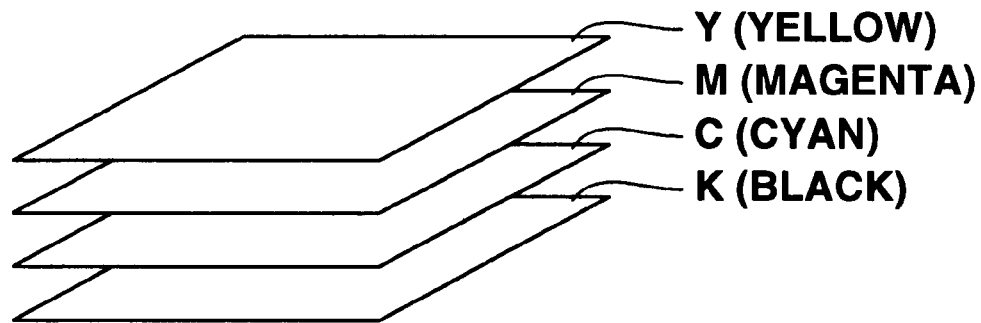
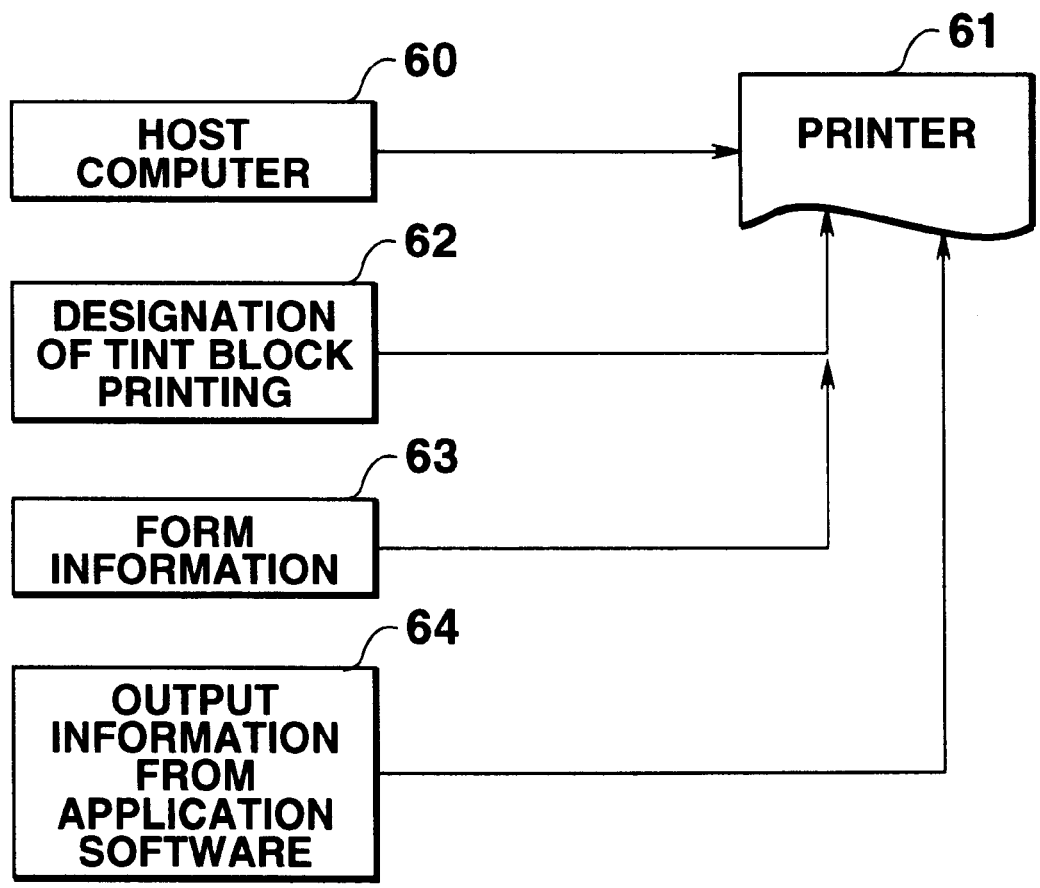
FIG.25

IMAGE GENERATING SYSTEM AND METHOD

BACKGROUND OF THE INVENTION

1. Field of the Invention

The present invention relates to an image generating system and method for generating an image to which a background image is added.

2. Description of the Related Art

Documents produced with a computer using application software, such as a word processor or a spreadsheet program, can be printed on a sheet by a printer. For example, when printing documents produced using a spreadsheet program, the computer sends a spreadsheet form (data for frames of a spreadsheet) to the printer first, then the computer sends print data, including alphanumeric character code or the like to the printer. The printer synthesizes the image of the spreadsheet form and the image of the print data using a so-called overlay method, and prints the synthesized image.

Also, a background image is added to each item of a spreadsheet or a graph. For example, when a user wants to add background colors item by item (column by column) for separation, the user specifies the background color data in addition to the other data. Background color data, in addition to a spreadsheet form and print data, are sent to a printer from a computer. The printer synthesizes the image of the spreadsheet form, the image of the print data, and the image of the background colors, and prints the synthesized image.

Since according to conventional technology, however, the background color data must be sent to the printer from the computer in addition to the spreadsheet form and print data As a result, the amount of data to be sent to the printer is increased and it takes a long time to transfer the data. As it is also necessary for application software to include a function for outputting background color data such a program is complex. Furthermore, an operation performed by the user becomes complex because of the need to specify the background colors.

SUMMARY OF THE INVENTION

An object of the present invention is to provide an image generating system and method that can generate images to which background images are added without requiring an input of extra data for background images.

To achieve the above described object, an image generating system according to the first aspect of the present invention generates an image based on drawing information including frame data for drawing a frame image and in-frame data for drawing images to be arranged in the frame image, said image generating system comprising:

in-frame data recognition means for recognizing peculiarity such as numeric value, characters or the like of the in-frame data;
  background data generating means for generating background data corresponding to the peculiarity recognized by said in-frame data recognition means;
  frame data image generating means for generating the frame image defined by the frame data;
  in-frame data image generating means for generating the images defined by the in-frame data;
  background image generating means for generating an image defined by the background data generated by said background data generating means; and
  synthesized image generating means for synthesizing the images generated by said frame data image generating means, said in-frame data image generating means and said background image generating means, and for outputting a synthesized image.

According to the above described structure, the image generating system of the present invention can overlay an image defined by the background data on an image defined by the frame data, and an image defined by the in-frame data image without requiring an input of any extra data.

The image generating system may further comprise print means for printing the synthesized image generated by said synthesized image generating means on a recording medium such as a paper, a film or the like.

Said synthesized image generating means may comprise a frame memory in which all the images generated by said frame data image generating means, said in-frame data image generating means, and said background data generating means are to be developed.

Said synthesized image generating means may comprise:
  a first frame memory in which the image generated by said frame data image generating means is to be developed;
  a second frame memory in which the both of the images generated by said in-frame data image generating means and said background image generating means are to be developed; and
  image synthesizing means for synthesizing images developed in said first and the second frame memories.

Said synthesized image generating means may comprise:
  a first frame memory in which the image generated by said frame data image generating means is to be developed;
  a second frame memory in which the image generated by said in-frame data image generating means is to be developed;
  a third frame memory in which the image generated by said background data generating means is to be developed; and
  image synthesizing means for synthesizing images developed in said first, second and third frame memories.

In case that the image generating system comprises means for not adding the background data where the frame data and in-frame data are to be written, the amount of toner used in the image generating system will decrease. Furthermore, the image of the in-frame data can be seen clearly, even if an image of the in-frame data is lighter than that of the background data.

If the in-frame data are data of numeral characters, said in-frame data recognition means may include means for determining one of numeric value ranges to which the numeric value of the in-frame data belongs; and said background data generating means may comprise means for storing a plural pieces of background data corresponding to the numeric value ranges.

In the above described image generating system, the plural pieces of background data define colors, patterns, or gradations which are determined based on numeric value ranges and which are different from each other.

To achieve the above described object, an image generating method according to the second aspect of the present invention comprises the steps of:

(a) receiving information for defining an image of a document having a plurality of frames and numeral characters to be written in the frames;
  (b) designating a specific frame in the document;

(c) generating background data corresponding to a value indicated by the numeral characters to be written in the specific frame;

(d) specifying an area, including the specific frame; and (e) generating an image of the document to which the background data is added.

The image generating method may further comprise the step of printing the image generated by the step (e) on a recording medium.

In the image generating method, it is possible that:

the document includes a table in which a plurality of frames are arranged in a matrix form of rows and columns;

the specific frame is one frame of the table; and the area is composed of the specific frame.

In the image generating method, it is also possible that:

the document includes a table in which a plurality of frames are arranged in a matrix form of rows and columns, the specific frame is one frame in a row or a column; and the specified area is the row or the column including the one frame.

In the image generating method, it is also possible that:

the document includes a table in which the frames are arranged in a matrix form of rows and columns;

a plurality of frames in a row or a column are specified as the specific frame;

said background data is determined in accordance with a value which is obtained by a calculation of values indicated by the numeral character in the plurality of the specified frame; and the area in the table is the row or the column.

To achieve the above described object, an image generating system according to the third aspect of the present invention comprises:

input means for inputting a unit tint pattern and document data;

tint image generating means for developing an image of the unit tint pattern repeatedly in a first memory;

document image generating means for developing an image of the document in a second image memory; and image synthesizing means for synthesizing the images developed in said first and second image memories.

BRIEF DESCRIPTION OF THE DRAWINGS

FIG. 8 is a diagram showing the structure employed for defining information when an extension rate of receipts is a reference object according to the first embodiment;

FIG. 11 is a diagram showing an example of a spreadsheet to which background colors are added line by line according to the first embodiment;

FIG. 17 is a diagram showing an example of a spreadsheet to which background colors are added item by item according to the second embodiment;

FIG. 25 is a diagram explaining the printing process according to the third embodiment;

DETAILED DESCRIPTION OF THE PREFERRED EMBODIMENT

First Embodiment

The first embodiment of the present invention will now be described while referring to the accompanying drawings.

Figure 1:
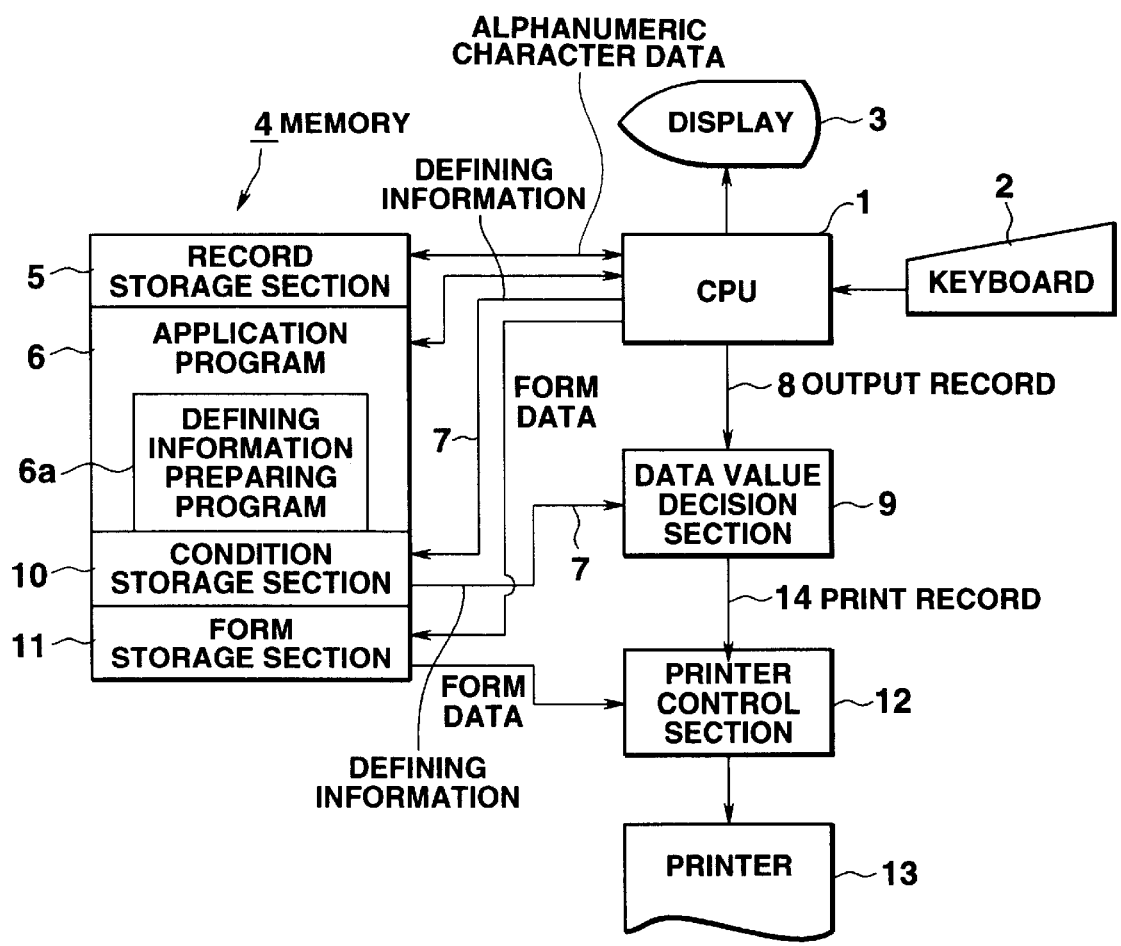
FIG. 1 is a block diagram showing the system structure of an image generating system according to the first embodiment of the present invention.

FIG. 1 is a block diagram showing the system structure of a print system according to the first embodiment of the present invention.

The print system automatically adds background colors to a document, which is prepared by the system, and prints the resultant document. The print system comprises a CPU 1, a keyboard 2, a display 3, a memory 4, a data value decision section 9, a printer control section 12, and a printer 13.

The memory 4 comprises an area in which an application program 6, such as a spreadsheet program and a word processor, is stored, a record storage area 5 for storing alphanumeric characters in a document, a condition storage area 10 for storing conditions to add background colors to a document, and a form storage area 10 for storing forms (described later) of a document to be printed. The application program 6 includes a defining information preparing program 6a for preparing defining information to print background colors.

A spreadsheet program is used for the application program 6 in the embodiment. Therefore, a spreadsheet is prepared in this embodiment. A background color image is added to the spreadsheet, line by line.

The print system may be a single apparatus, including therein all of the structures described above. The print system may be comprised of a computer, including the CPU 1, the keyboard 2, the display 3, and the memory 4, and a printer unit, including the data value decision section 9, the print control section 12, and the printer 13. The print system may be comprised of a terminal, including the keyboard 2 and the display 3, a host computer including, the CPU 1, the memory 4, the data value decision section 9 and the printer control section 12, and a printer composed of the printer 13.

The CPU 1 prepares form data for defining forms (frames) of a spreadsheet based on data which a user inputs from the keyboard 2, and stores the prepared data in the form storage area 11 by executing the application program 6. Details concerning the form data will be given later.

The CPU 1 sets the defining information 7, which indicates the conditions that apply for the printing of background color images, and stores the defining information 7 in the condition storage area 10. Details concerning the defining information 7 will be given later.

The CPU 1 executes the application program 6, and arranges alphanumeric characters, equations, and resultant calculations, or the like, input through the keyboard 2 in the form required for the preparation of a spreadsheet. The input alphanumeric characters, or the like, are stored in the record storage area 5.

The CPU 1 reads the alphanumeric characters in the prepared spreadsheet from the record storage area 5 line by line, for example, when a user inputs a print command through the keyboard 2. The CPU 1 outputs the read alphanumeric characters as an output record 8 to the data value decision section 9.

Figure 2:
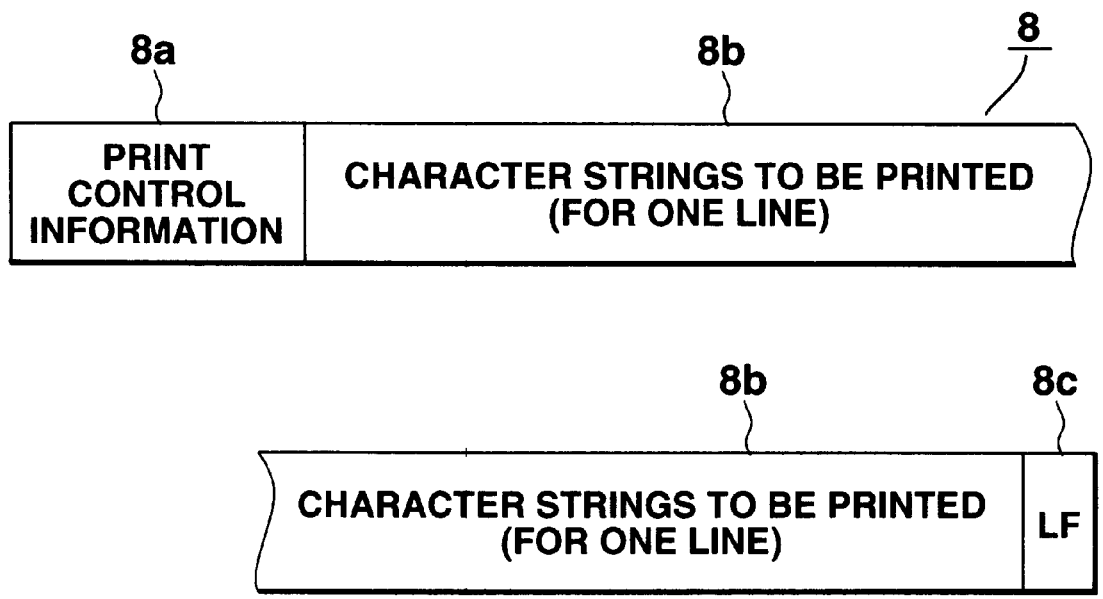
FIG. 2 is a diagram showing the data structure of an output record according to the first embodiment.

The output record 8, output from the CPU 1, comprises print control information 8a and print character strings 8b, as shown in FIG. 2. The print control information 8a is information for controlling the lines in a spreadsheet. The print character strings 8b comprises code data for alphanumeric characters. When alphanumeric characters for a plurality of lines are inserted in one line (in the frame for one line) of the spreadsheet, alphanumeric characters for a plurality of lines are inserted in one print character string 8b. The character data includes item data (name of goods, receipts, gross receipt, the inventory count or the like) for items that are arranged in a line for the title of the spreadsheet, for example. The numeric characters represents numeric values, for example, corresponding to each of the items.

The numeral character data is recorded at a position corresponding to an item to which the numeric data belongs in the output record 8. For example, numeral character data indicating receipts are recorded in an area corresponding to a "RECEIPTS" item in the output record 8, and numeric data indicating a sum for a "gross receipt" is recorded in an area corresponding to a "GROSS RECEIPT" item. Each of the areas is represented by a number of bytes measured from the head of the output record 8 or from the head of the print character strings 8b, or the like.

The defining information 7 is needed it is to be decided what the background colors are to be added to a document are decided. The defining information 7 includes items (reference items) to be referred to for deciding what the background colors are to be, or information indicating a relationship between the numeric value and the background color for the item.

Figures 3, 5:
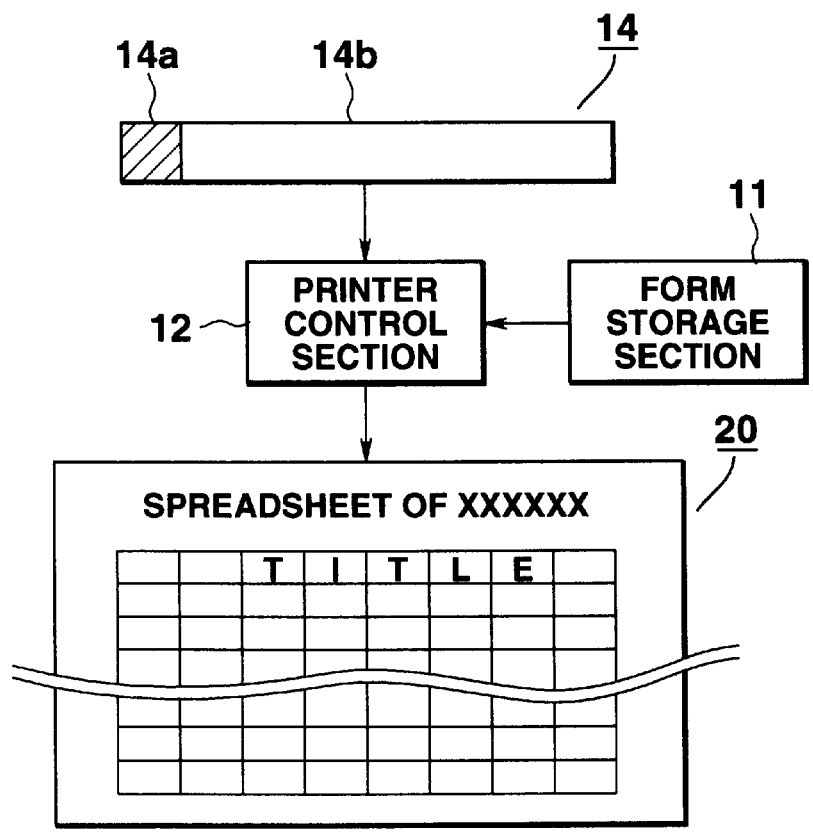
FIG. 3 is a diagram showing the structure for defining information according to the first embodiment.
FIG. 5 is a diagram explaining that background color is printed on a corresponding line of a spreadsheet form according to the first embodiment.

As shown in FIG. 3, the defining information 7 is registered in a table indicating the relationship among the "reference items" that are to be referred to when deciding the background color, the range for a numeric value to be set in the item, and the color data and the gradation data for the background color corresponding to the range of the value. In this example, the color data is represented by 5-bit data and the gradation data is represented by 3-bit data. Therefore, 32 ($=2^5$) background colors having 8 ($=2^3$) gradations can be designated. The density of the gradations increase as the numeric values become greater. A user inputs the defining information 7 through the keyboard 2.

The defining information 7 may define a threshold value instead of the range of the value.

The form data prepared by the CPU 1 and stored in the form storage area 11 is required for the printing of the frames of a spreadsheet. The form data includes: information for defining the frames themselves; information for defining unit areas (referred to as lines in this embodiment) to which a background color is added; and actual color pattern data indicating the mixture ratio for the yellow (Y), magenta(M), cyan(C) and black (K) used for each color. The forms of spreadsheets differ if different application programs are used. Even if the same application program 6 is used, the forms differ from spreadsheet to spreadsheet.

Figure 4:
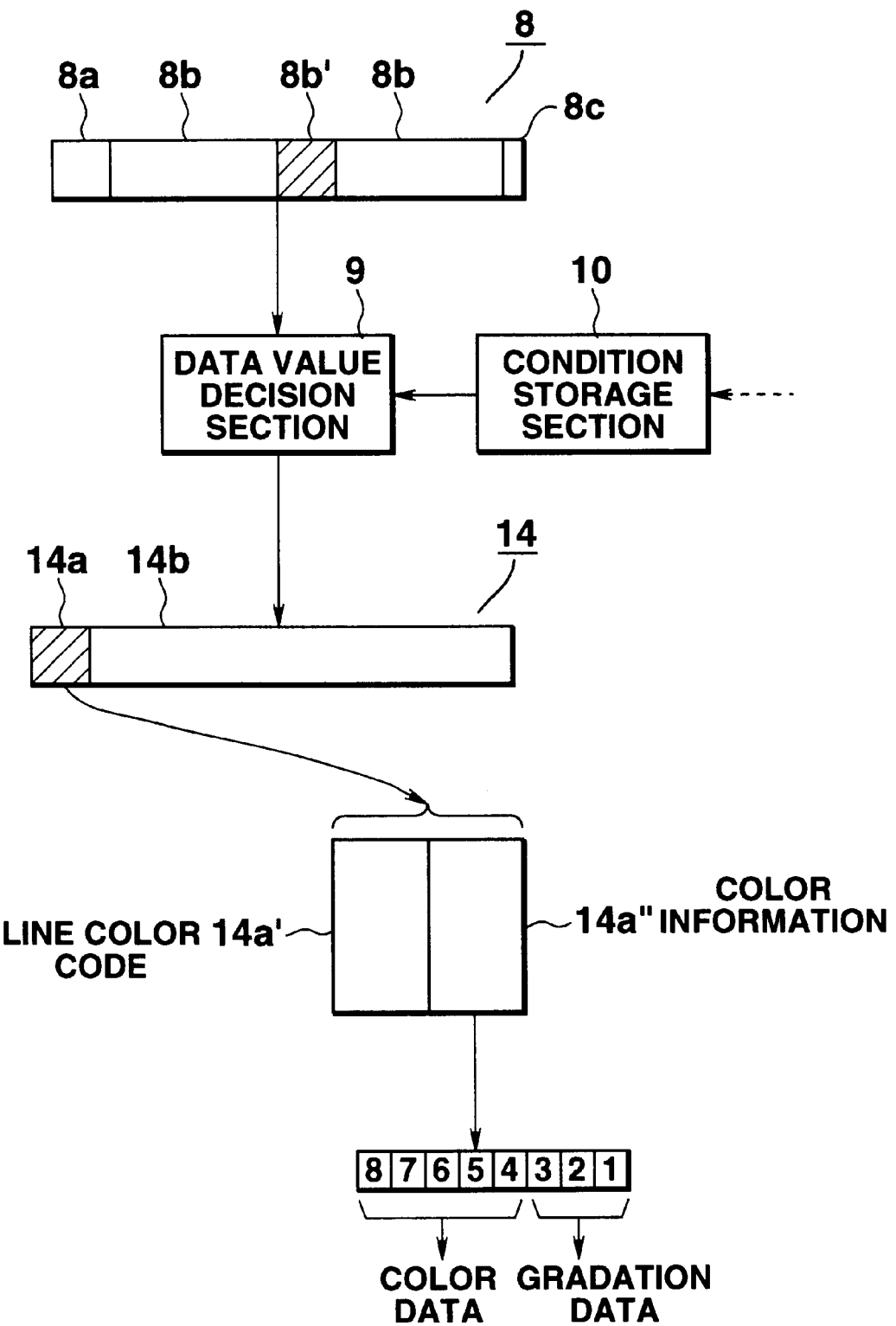
FIG. 4 is a diagram showing the data structure of a print record prepared from an output record and for defining information according to the first embodiment.

The data value decision section 9 selects "REFERENCE ITEM" in the defining information 7 stored in the condition storage area 10. In addition, the data value decision section 9 designates the position for the area corresponding to the reference item in the output record 8 by giving the number of bytes measured from the head of the output record 8, for example. When the output record 8 is supplied, the data value decision section 9 reads data that is set in designated area 8b', as shown in FIG. 4. If the data that is read (that is, the contents of the reference items) are not numeral character data, the data value decision section 9 sets a "0" for a line color code 14a' as an instruction not to add a background color; if the read data is numeral character data, the data value decision section 9 sets a "1" for the line color code 14a' as an instruction to add a background color.

When a background color is added, the data value decision section 9 determines the range, set in the table for the defining information 7 shown in FIG. 3, where the data value that is read, belongs. Then, 5-bit color data and 3-bit gradation data corresponding to the determined range are connected by the data value decision section 9 and the data value decision section 9 outputs the connected data as color information 14a".

As shown in FIG. 4, the data value decision section 9 adds the generated line color code 14a' and a color information section 14a having the color information 14a" to print data 14b, the same as for the output record 8, to generate a print record 14.

The print record 14 generated by the data value decision section 9 is output to the printer control section 12.

As shown in FIG. 5, the printer control section 12 develops the form data read from the print record 14 to provide a frame memory (described later), and the form data read from the form storage area 11 to provide another frame memory (described later). The printer control section 12 synthesizes the images developed in the frame memory, and the printer 13 prints the synthesized images.

Figure 6:
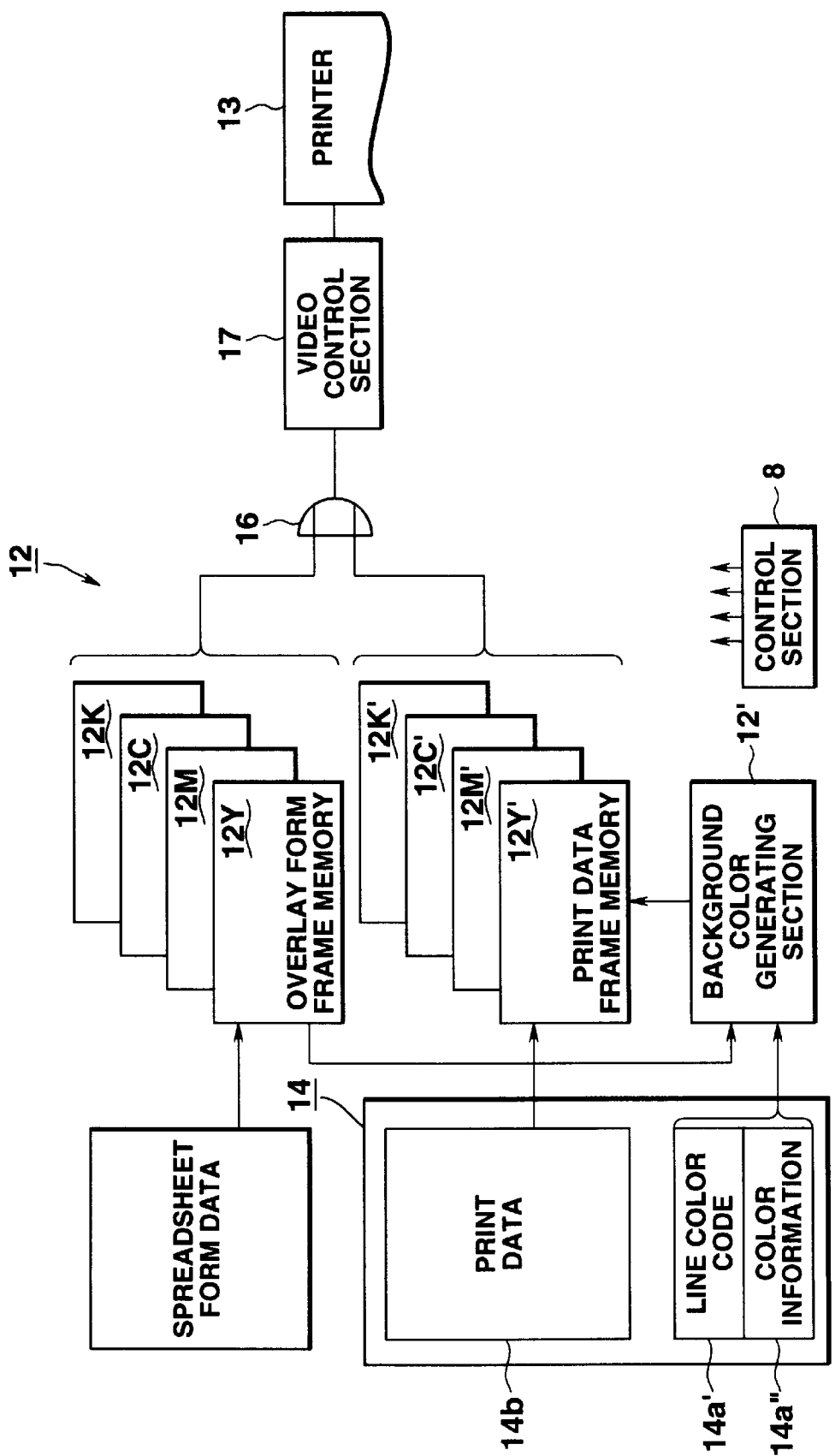
FIG. 6 is a block diagram explaining the synthesizing data in a printer control section according to the first embodiment.

FIG. 6 shows the basic structure of the printer control section 12.

As illustrated, the printer control section 12 comprises overlay form frame memories 12Y, 12M, 12C and 12K, print data frame memories 12Y', 12M', 12C' and 12K', a background color generating section 12', an OR circuit 16, a video control section 17, and a control section 18.

Each of the overlay form frame memories 12Y, 12M, 12C and 12K has a storage capacity of one page with an arbitrary depth, and the components yellow (Y), magenta (M), cyan (C) and black (K) for the spreadsheet form images are stored therein as bit map patterns with gradations.

The control section 18 develops the bit map patterns for the images having the components yellow (Y), magenta (M), cyan (C) and black (K) as images, with gradations, in the overlay form frame memories 12Y, 12M, 12C and 12K, in accordance with the form data stored in the form storage area 11. For example, if a black spreadsheet form is prepared, the control section 18 develops a bit map pattern, in accordance with the actual color pattern, for the spreadsheet form in the overlay form frame memory 12K. If the prepared frame for the spreadsheet form is yellow, the control section 18 develops the spreadsheet form in the overlay form frame memory 12Y.

Each of the print data frame memories 12Y', 12M', 12C' and 12K' has a storage capacity of one page with an arbitrary depth, the components of yellow (Y), magenta (M), cyan (C) and black (K) for the print data image and the background image (the background color) are stored therein. The control section 18 develops each color component in the image print data 14b in the print record 14 in the print data frame memories 12Y', 12M', 12C' and 12K', in accordance with the actual color pattern data. For example, if the print data image is blue, bit map patterns are developed in the print data frame memories 12M' and 12C' by employing the subtractive color mixture principle. If the print data image is red, bit map patterns are developed in the print data frame memories 12M' and 12Y'.

The background color generating section 12' generates background colors based on the line color code 14a' and the color information 14a". The control section 18 determines the range within which the background color is added based on the information stored in the form storage area 11. Further, the control section 18 determines the actual color pattern data in accordance with the color information, and develops bit map patterns in the designated areas in the print data in the frame memories 12Y', 12M', 12C' and 12K'.

Therefore, both of the print data and the background colors are developed in the print data frame memories 12Y', 12M', 12C' and 12K'.

The OR circuit 16 obtains the disjunctions (ORs) of the bit map data for each of the coordinates developed in the overlay frame memories 12Y, 12M, 12C and 12K, and the bit map data for each of the coordinates developed in the print data frame memories 12Y', 12M', 12C' and 12K'.

Therefore, the spreadsheet form image, the print data image and the background color image are synthesized by the OR circuit 16.

The output from the OR circuit 16 is converted into a signal that is required for printing (for example, a signal for controlling the emission of light of the LED printer) in the video control section 17. The converted signal is sent to the printer 13, and the spreadsheet is printed on a sheet by the printer 13.

The printer control section 12 has a frame memory in which the spreadsheet form image is to be developed and a frame memory in which the print data image is to be developed. The background color image is developed in a frame memory in which the print data image is developed. Therefore, the spreadsheet form image does not need to be redeveloped even if the print data or the background color are changed. And when the same spreadsheet form is used, the print system can print a plurality of spreadsheets at a high speed.

Operation of the printer according to this embodiment will now be described with reference to a case involving the preparation and the printing of a spreadsheet.

Figure 7:
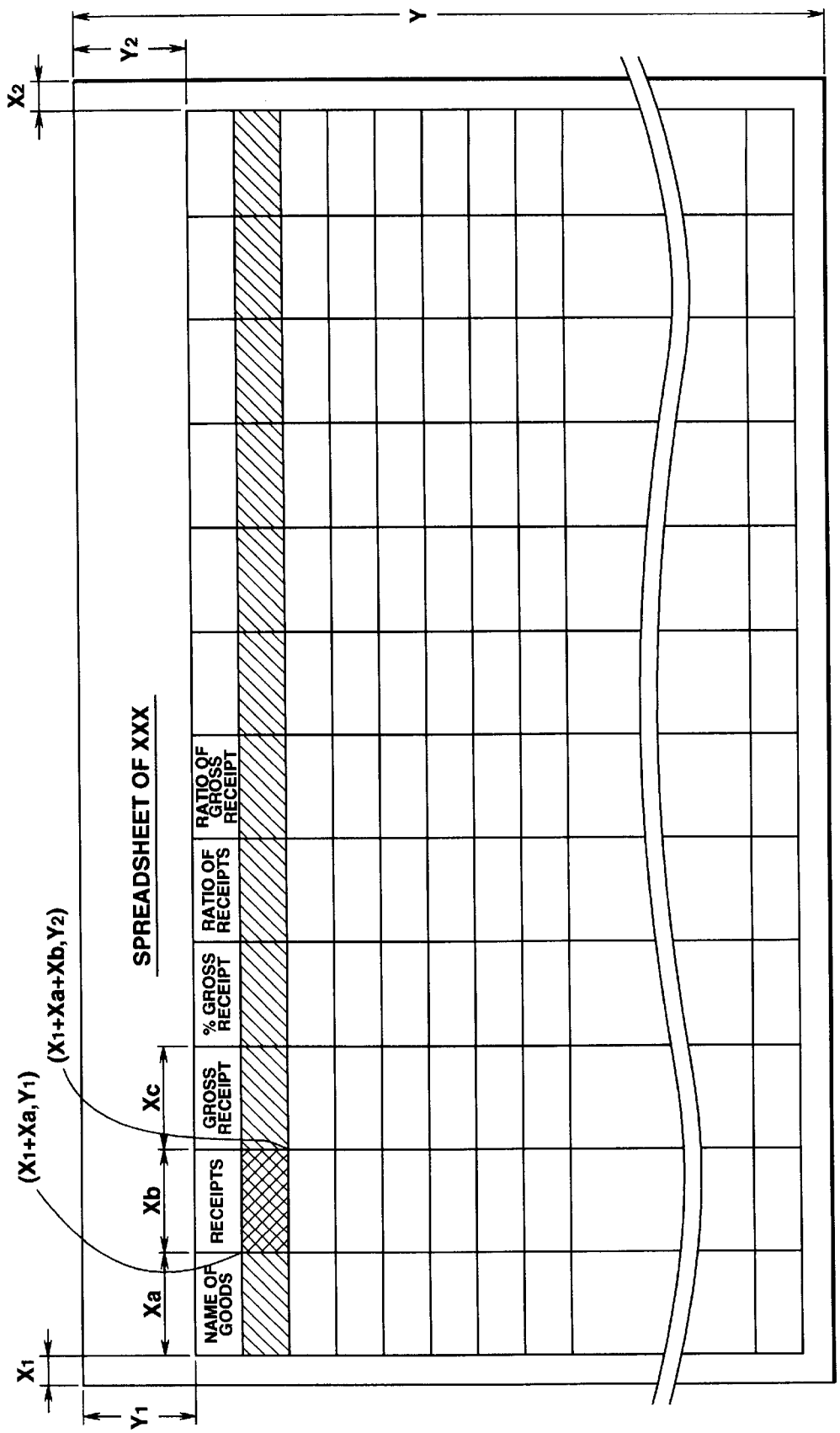
FIG. 7 is a diagram showing an example of the structure of a spreadsheet form according to the first embodiment.

To begin, a user inputs the width or line space for the frame in each item through the keyboard 2, and the CPU 1 prepares a spreadsheet form in accordance with the application program 6. For example, as shown in FIG. 7, the size of the left margin X1, the size of the right margin X2, the end position of the spreadsheet Y, the width of each of the cells (columns) Xa, Xb, Xc, . . . , the positions of the lines in the spreadsheet Y1, Y2, or the like, are input through the keyboard to prepare a spreadsheet form.

In accordance with the instructions input by a user through the keyboard 2, the CPU 1 stores the prepared spreadsheet form in the form storage area 11 as is provided for by the application program 6.

The user inputs data through the keyboard 2, as is provided for the defining information preparing program 6a, to prepare the defining information 7.

FIG. 8 shows an example of the defining information. The defining information shown in FIG. 8 has sub items "RECEIPTS" in a major item "EXTENSION RATE," that is "EXTENSION RATE OF RECEIPTS" as a reference item, and indicates the range of the extension rate (hereinafter referred to as numeric value range), and the color data and the gradation data at that time. For example, when the extension rate $x$ for the receipts is $0 \leq x < 50$, the color data is "red" and the gradation data is "6." When the extension rate $x$ for the receipts is $50 \leq x < 100$, the color data is "red" and the gradation data is "3." The prepared defining information 7 is stored in the condition storage area 10, and is output to the data value decision section 9.

The user inputs alphabetic character data indicating items, or the like and numeral character data indicating numeric values in each of the items, or the like, for each cell of the spreadsheet through the keyboard 2, as provided for by the application program 6. These alphanumeric data are stored in the record storage area 5.

When the spreadsheet is completed, the user enters a printing instruction by operating the keys of the keyboard 2. In response to the instruction, the CPU 1 reads the line control information and the alphanumeric character data from the record storage area 5, and outputs them as the output record 8 to the data value decision section 9.

Figure 9:
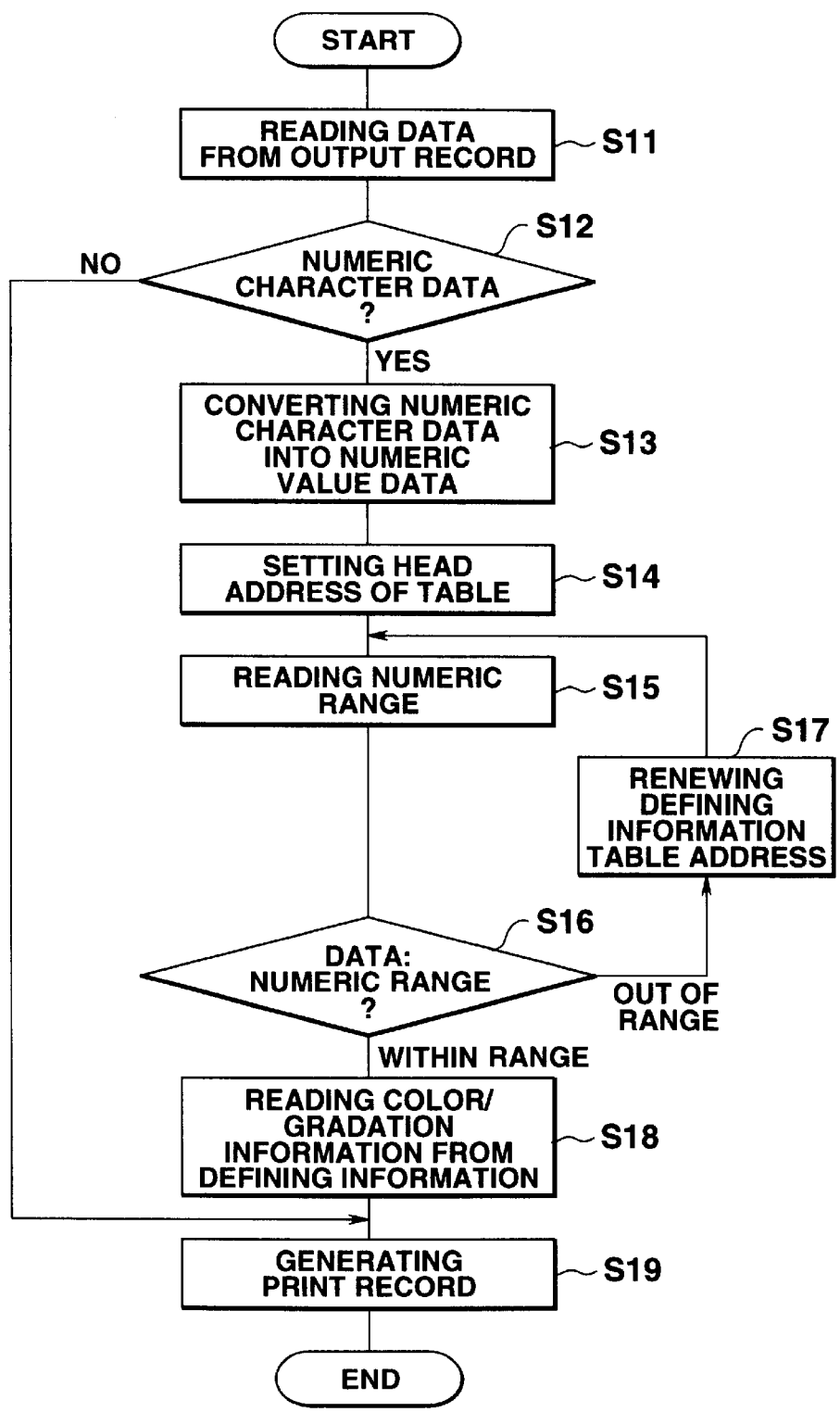
FIG. 9 is a flowchart showing the process for generating a print record from an output record and for defining information according to the first embodiment.

The data value decision section 9 generates a print record 14 from the output record 8 and the defining information 7 in accordance with the process shown in FIG. 9.

First, the data value decision section 9 determines the reference items in accordance with the defining information 7 registered in the condition storage area 10, and reads data for the reference item in the output record 8 (S11). Then, it is determined whether the data that is read is numeral character data or not (S12). If the data that is read is not numeral character data, the color information section 14a, for which the line color code 14a' is set "0," is added to the output record 8 to generate the print record 14.

If the data that is read is numeral character data, a "1" is set for the line color code 14a', and the data is converted into processable numeric value data (S13). In other words, the numeral character data, that is, code data entered as numeric characters, is converted into processable binary data indicating an actual numeric value. Then, the defining information 7 stored in the condition storage area 10 is read, and a pointer is set to the head address A1 of the table in the defining information 7 (S14).

Next, a numeric value range set at the address A1 designated by the pointer is read (S15). It is determined whether or not the read numeric value range that is read has a value indicated by the numeric value data (S16). If the value indicated by the numeric value data does not fall within the numeric value range, the address pointed to by the pointer is changed to the next address X2 in the table (S17), then and program control returns to step S15. Steps S15 to S17 are performed repeatedly until the value indicated by the numeric value data is a value that falls in the numeric value range.

If it is determined at step S16 that the value indicated by the numeric value data falls within the numeric value range, the color data and the gradation data corresponding to the numeric value range are read from the condition storage area 10 to generate the color information 14a" (S18).

The line color code 14a' and the color information section 14a in which is the color information 14a" are added to the output record 8, and the print record 14 is generated and output.

Every time the output record 8 is supplied, the data value decision section 9 executes the process in the flowchart shown in FIG. 9.

On the other hand, when printing is instructed, the printer control section 12 develops the image of the spreadsheet in the overlay form frame memories 12Y, 12M, 12C and 12K based on the spreadsheet form stored in the form storage area 11.

Figure 10:
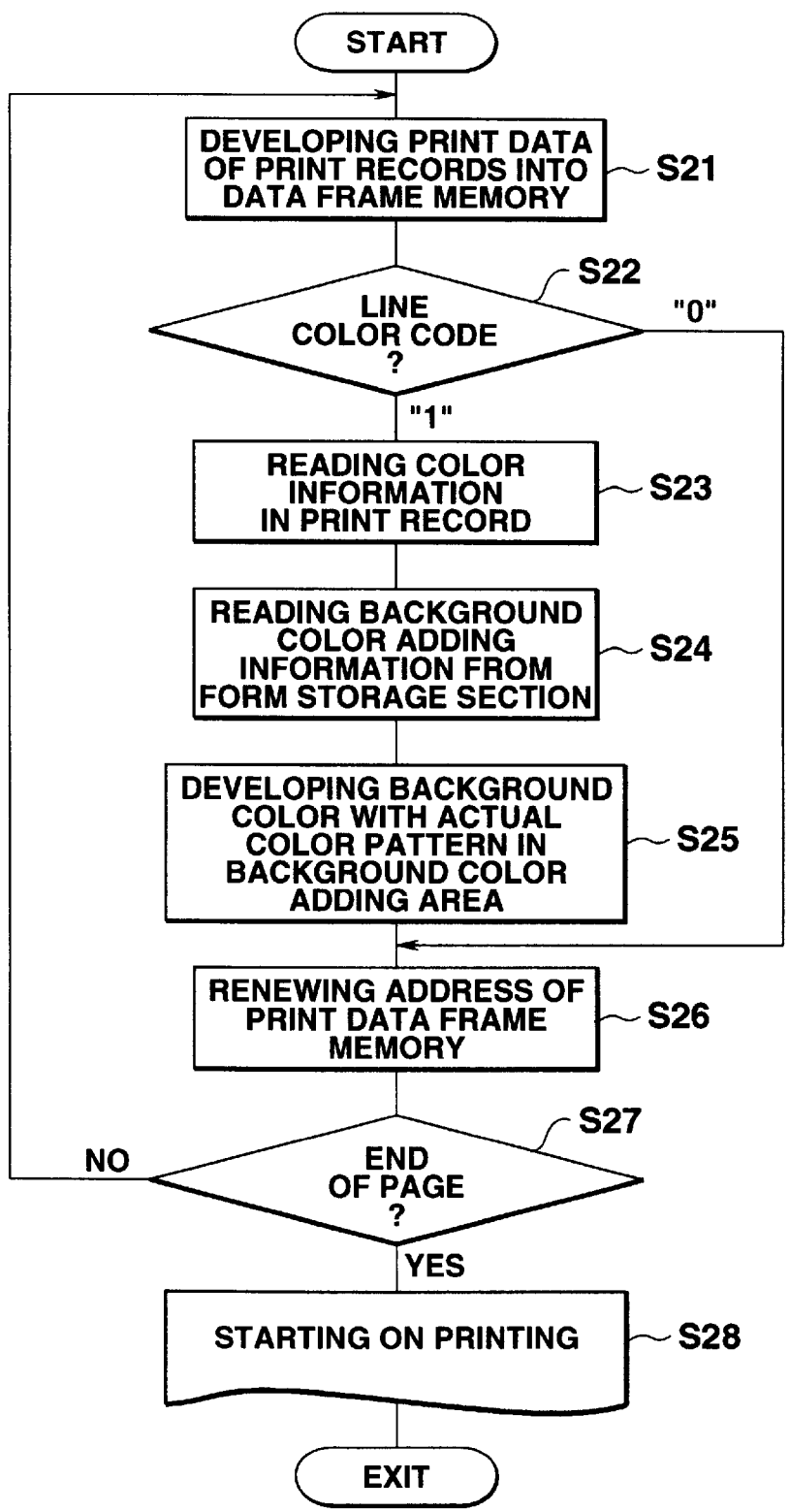
FIG. 10 is a flowchart showing the process for developing print data and a background color image in a print data frame memory according to the first embodiment.

Then, when the print data 14 is supplied from the data value decision section 9, the control section 18 in the printer control section 12 develops the image of the print data and the background color in the print data frame memories 12Y', 12M', 12C' and 12K'. This process will now be described while referring to the flowchart shown in FIG. 10.

The control section 18 develops the print data 14b for the supplied print record 14 in the print data frame memories 12Y', 12M', 12C' and 12K' (S21). It is then determined whether the line color code 14a' of the print record 14 is "0" or "1" (S22). If the line color code is "0," that is, if it is determined that the background color is not to be added to the line, the process for adding the background color is not performed and program control advances to step 26, which is described later.

If the line color code is "1", that is, if it is determined that the background color is to be added to the line, the color information 14a" in the print record 14 is read (S23). Information required for developing the background colors, such as information for defining a unit area where the background color, stored in the form storage area 11, will be added, information indicating the position of an area where the background color will be added, and actual color pattern data corresponding to the color information 14a" (S24) are obtained.

Next, the image of the background color is developed, in an area read at step S24, in the print data frame memories 12Y' 12M', 12C' and 12K' in accordance with the actual color pattern data (S25). For example, the background color is developed in the area whose coordinates are (X1, Y1) to (X2, Y2) in the spreadsheet shown in FIG. 7.

The address for the writing position in the print data frame memories 12Y', 12M', 12C' and 12K' is changed to develop the data in the print data 14b for the next line in the print data frame memories 12Y', 12M', 12C' and 12K' (S26). It is then determined whether the development of the print data 14b and the background color for one page has been completed or not (S27). If the development of the print data 14b and the background color for one page are has not been completed, program control returns to step S21 to perform the processing for the next print record 14. Thus, the steps S21 to S27 are repeatedly performed until the development of the print data and background color for one page of the spreadsheet has been completed.

If it is determined at step S27 that the development of the image data for one page has been completed, the spreadsheet is printed (S28).

To describe the process in detail, the control section 18 sequentially reads the bit map data developed in the overlay frame memories 12Y, 12M, 12C and 12K and the bit map data developed in the print data frame memories 12Y', 12M',12C' and 12K'. Data items having the same relative addresses in each of the frame memories are read, and the OR circuit 16 obtains the disjunctions (ORs) of each data pair that is read.

Therefore, the spreadsheet form image, the print data image, and the background color image are synthesized by the OR circuit 16.

The video control section 17 converts the output signal from the OR circuit 16 into a control signal that is required for printing, and the printer 13 prints the spreadsheet on a sheet in accordance with the control signal.

When there are a plurality of spreadsheets to be printed using the same form, the control section 18 develops the print data page by page but develops the form data once and uses it for each of the pages. Thus, time for developing the form data is not needed and the time required for printing is reduced.

The process described above will now be described while referring to the printing of the spreadsheet shown in FIG. 11. The defining information shown in FIG. 8 is used as the defining information.

When the output record 8 for the first line in the spreadsheet is output from the CPU 1, the data value decision section 9 reads the data corresponding to the reference item "EXTENSION RATE OF RECEIPTS," based on the defining information shown in FIG. 8 (S11). The print data 14b for the first line in the spreadsheet are item data, which are also character data. Therefore, the result obtained at step S12 is "NO," and a "0" is set for the line color code 14a' (S19) and the print record 14 is generated.

When the printer control section 12 receives the print record 14 for the first line, the printer control section 12 develops the bit map pattern for the character string of the first line in the print data frame memories 12Y', 12M', 12C' and 12K'.

Then, when the output record 8 for the second line is supplied to the printer controller 12, data "385.7%" (1), corresponding to the reference item "EXTENSION RATE OF RECEIPTS," is read (S11).

Because the data is numeral character data, the result obtained at step S12 is "YES". The data is converted into numeric value data at step S13, and the value held by the pointer is set to the head address A1 of the table in the defining information 7 at step S14. At step S15, the numeric value range "0≦x<50 (%)," which is set at the head address A1 of the table, is read, and it is determined at step 16 whether or not the numeric value data has a value that falls within the numeric value range. In this case, since the value indicated by the numeric value data does not fall within the numeric value range, the pointer changed to point to A2 at step S17, and program control returns to step S15 to read the next numeric value range.

Thus, the processing from step S15 to S17 is performed repeatedly. When the numeric value range "300≦X" is read, the value indicated by the numeric value data becomes a value that falls within the numeric value range, and thus the color data "green" and the gradation data "7" are read from the defining information 7 at step S18.

The print record 14 comprising the color code 14a' for which a "1" is set, the color information 14a" indicating "green," and the gradation data indicating a "7" is generated.

When the printer control section 12 receives the print record 14 for the second line, the printer control section 12 develops the image of the alphanumeric character string(s) in the second line, and the background color image, based on the color information 14a", in the print data frame memories 12Y', 12M', 12C' and 12K'.

Since the output record 8 for the third line has reference item data (2) indicating "234.9%," the print record 14 having the line color code 14a' for which a "1" is set, the color data indicating "green," and the gradation data indicating a "3" is generated. Since the output record 8 for the fourth line has reference item data (3) indicating "291.5%," the print record 14 having the line color code 14a' for which a "1" is set, the color data indicating "green," and the gradation data indicating a "3" is generated. Since the output record 8 for the fifth line has reference item data (4) indicating "93.3%," the print record 14 having the line color code 14a' for which a "1," the color data indicating "red," and the gradation data indicating a "3" is generated.

When the printer control section 12 receives the print record 14 for each line, the printer control section 12 develops the image for the alphanumeric character string(s) in the line, and the background color image based on the color information 14a" in the print data frame memories 12Y', 12M', 12C' and 12K'.

When the development of the image data for one page of the spreadsheet shown in FIG. 11 is finished, the form data previously developed in the overlay form frame memories 12Y, 12M, 12C and 12K, and the pattern data developed in the print data frame memories 12Y', 12M', 12C' and 12K' are sequentially synthesized by the OR circuit 16, and the resultant data is output to the video control section 17 and is printed by the printer 13.

As described above, according to this embodiment the background color can be automatically added line by line in correspondence with to the size of the value that is set in the arbitrary item (column) in the spreadsheet. Therefore, spreadsheets, or the like, can be printed clearly by employing a simple operation.

Although one item (column) is used as the reference item in the first embodiment, a plurality of items may be employed as the reference items.

Figure 12:
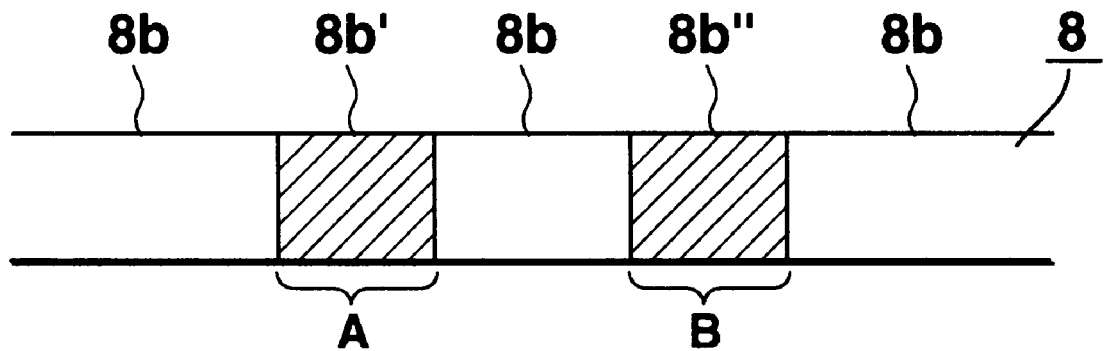
FIG. 12 is a diagram showing the structure for defining information that refers to two items according to the first embodiment.
Figure 13:
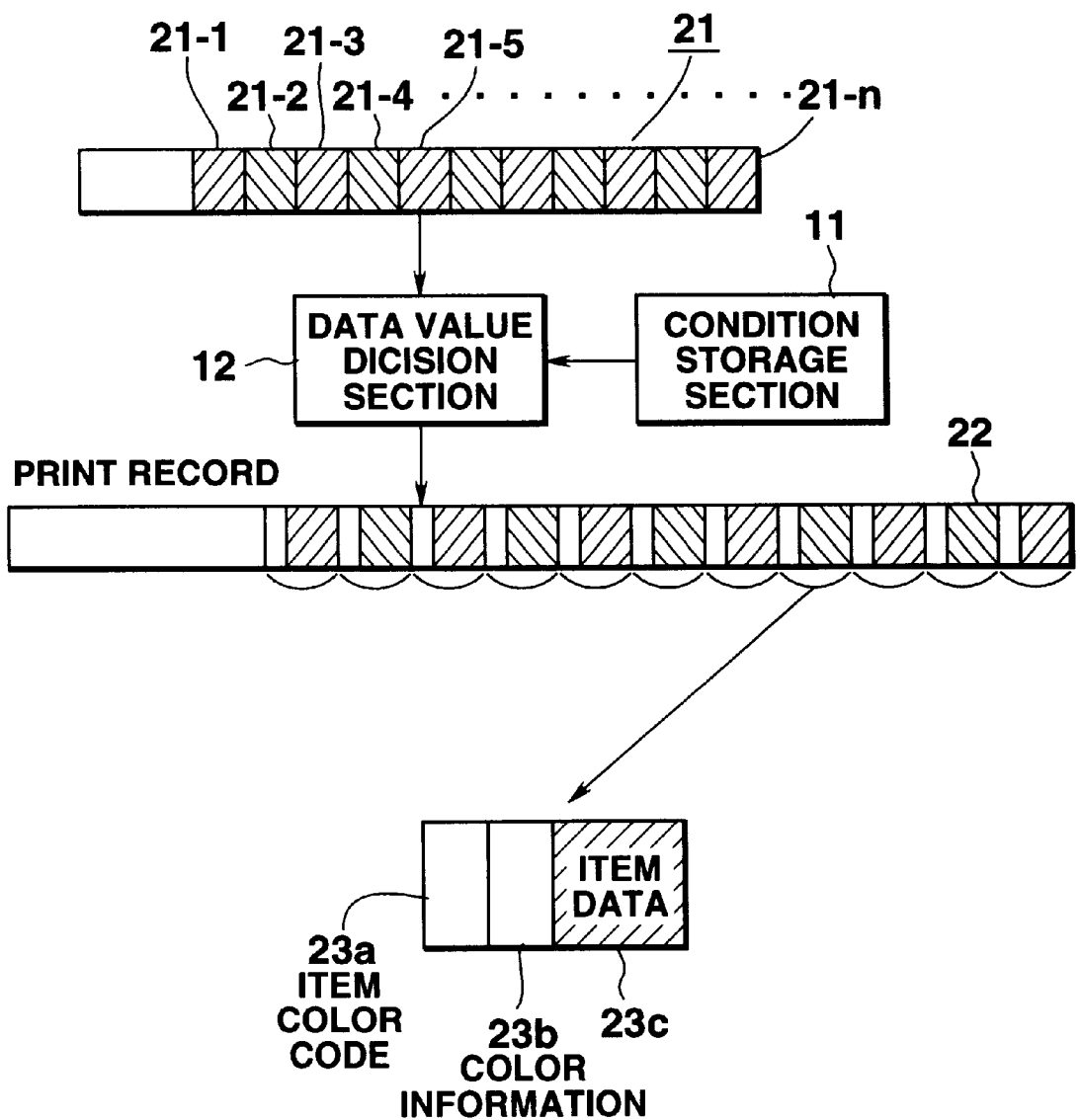
FIG. 13 is a diagram showing the data structure of a print record prepared from an output record and defining information according to the second embodiment of the present invention.

For example, if the reference items A and B are set first, then the background color and the gradation may be defined in correspondence with to the value A×B. In an example shown in FIG. 12, when the value A×B is equal to or greater than 70 and is smaller than 75, "red" is set for the background color and "2" is set for the gradation.

According to the above described structure, given that the reference item A is a target receipts and the reference item B is a target achievement rate, the background color substantially corresponding to the receipts is added, line by line.

In the same manner, a plurality of reference items are set first, and the color and gradation may be set in accordance with the sum for the values of these items. For example, if the receipts for goods 1 is set for the reference item A, the receipts for goods 2 is set for the reference item B, and the receipts for goods 3 is set for the reference item C, then the background color can be set based on the total for the receipts.

Second Embodiment

Although the background colors are set line by line in the first embodiment, the background colors may be set item by item. An embodiment for explaining the setting of background colors item by item will now be described.

According to this embodiment, the CPU 1 outputs an output record 21 that is substantially same as the output record described in the first embodiment.

According to this embodiment, the data value decision section 9 reads data 21-1, 21-2, . . . , 21-n for each of the items in the output record 21, and determines whether item data that is read is alphabetic data or numeric data. If the item data is alphabetic data, the data value decision section 9 sets a "0," which is an instruction not to add a background color, for an item color code 23a, which is used to determine whether or not a background color will be added to the item data.

On the other hand, if the item data is numeral data, the data value decision section 9 sets a "1," which is an instruction to add a background color, for the item color code 23a. The data value decision section 9 converts the numeral data into numeric value data, and compares the value indicated by the numeric value data with the numeric value range stored in the defining information 7, in the condition storage area 10, so as to generate color information 23b, item by item. The data value decision section 9 adds the item color code 23a and the color information 23b to data 23c (21-1 to 21-n) for each item to generate a print record 22.

The generated print record 22 is output to the printer control section 12.

The printer control section 12 synthesizes the image of the form data stored in the form storage area 11 and the image of the print record 22, and the printer 13 prints the synthesized image.

To continue the above description, the printer control section 12 develops the image of the form (the frame) in the overlay form frame memories 12Y, 12M, 12C and 12K based on the spreadsheet form stored in the form storage area 11.

Figure 15:
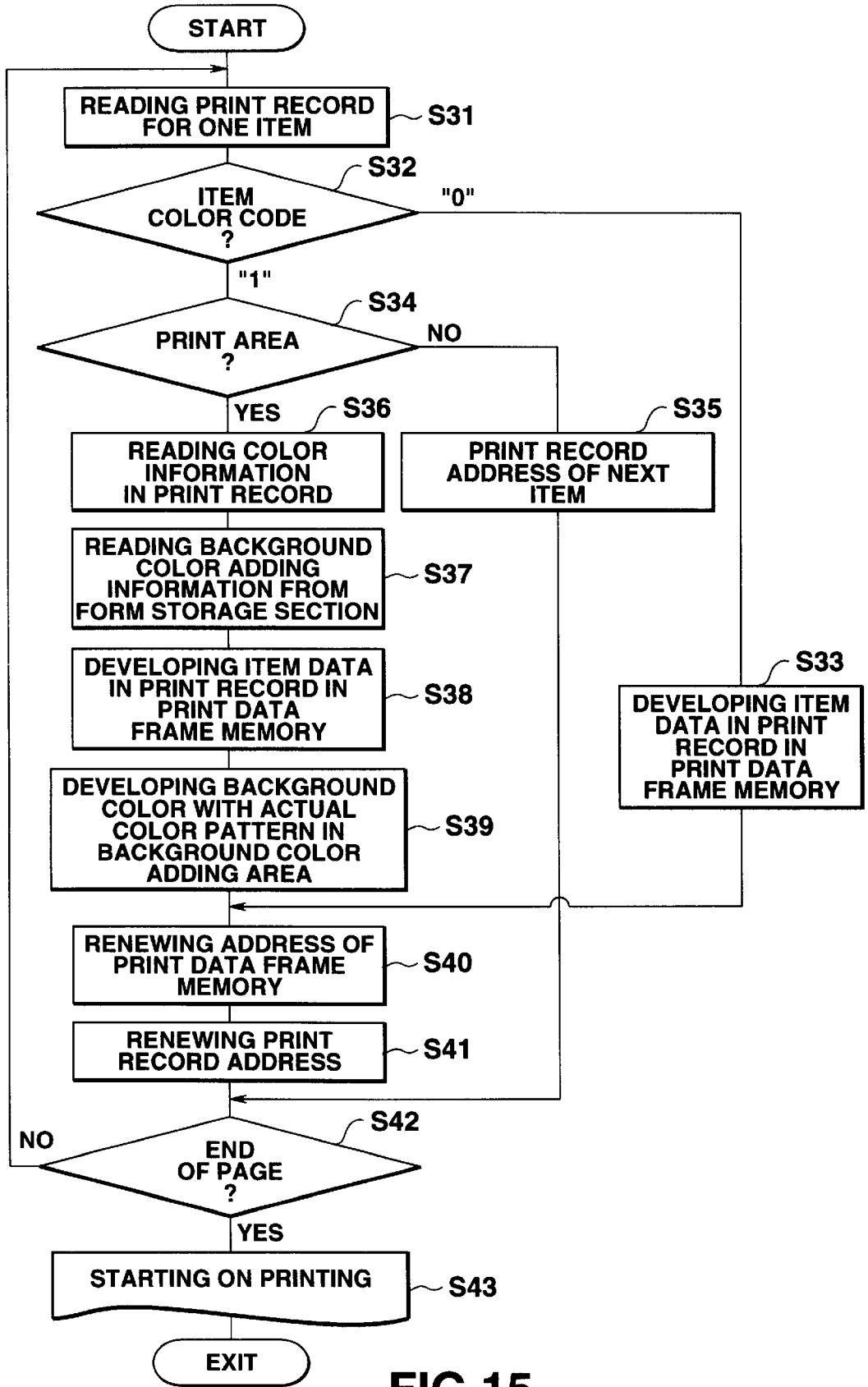
FIG. 15 is a flowchart showing the process for developing print data and a background color image in a print data frame memory according to the second embodiment.

Then, the printer control section 12 develops the print data and the image for the background color in the print data frame memories 12Y', 12M', 12C' and 12K' in accordance with the flowchart shown in FIG. 15.

That is, when the print record 21 is supplied, the printer control section 12 reads data item by item (S31). The printer control section 12 determines whether the item color code 23a is a "0" or a "1" (S32). If the item color code 23a is a "0," because the item data 23c is alphabetic data, the data is converted as is into pattern data, and is developed in predetermined areas in the print data frame memories 12Y', 12M', 12C' and 12K' (S33).

If it is determined that the item color code 23a is a "1" at step S32, further, it is determined whether or not the item data falls within the print area, that is, whether the item data is data to be printed (S34). If the item data does not fall within the print area, the address for the print record 14' is changed to that for the next item (S35).

If it is determined that the item data 23c falls within the print area, the color information 23b, an associated item, is read (S36). Information that is required for adding the background colors, such as information for defining a unit area to which the background color, stored in the form storage area 11, will be added, information for defining the position of the area where the background color is defined, or the actual color pattern data corresponding to the color information 23b (S37) is obtained.

First, the image for the item data 23c is developed in the print data frame memories 12Y', 12M', 12C' and 12K' (S38). Then, the background color is developed in the background color adding area in the print data frame memories 12Y', 12M', 12C' and 12K' in accordance with the actual color pattern data (S39). The background color adding area is the area whose coordinates are (X1+Xa, Y1) and (X1+Xa+Xb, Y2), for example, reference the case for the receipts item for the spreadsheet shown in FIG. 7.

When the development of the item data and background color for one item at steps S31 to S39 is completed, the print data frame memory address Y is changed (S40), and the print record address is changed (S41). Then, it is determined whether or not the development of the item data for one page has been completed (S42). If the process has not been completed, program control returns to step S31, and the processing for the next item data 23a to 23c is performed in the same manner. If the address for the print record for one line has been changed from that for the last item, the address is changed to that for the first item in the print record for the next line.

If it is determined that the processing for the data for one page has been completed, the printer 13 is instructed to print (S43).

Figures 14, 16:
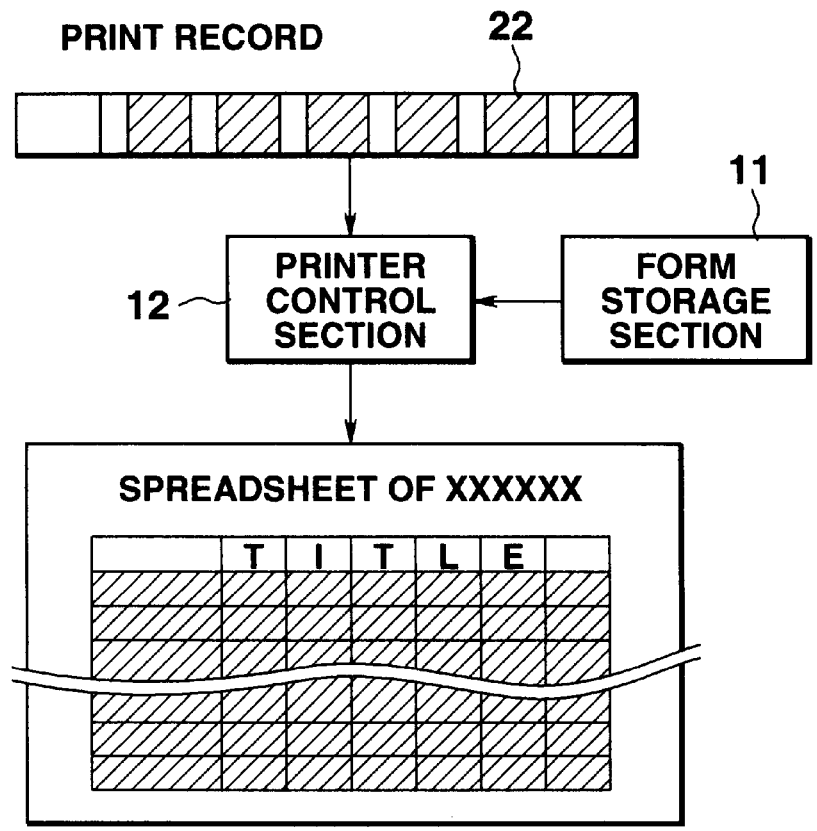
FIG. 14 is a diagram explaining that background colors are printed on a corresponding item in a spreadsheet form according to the second embodiment.
FIG. 16 is a diagram showing the structure for defining information according to the second embodiment.

The process described above will now be described concretely while referring to the spreadsheet shown in FIG. 17. The defining information used herein is that shown in FIG. 16.

Because the data for each item in the first line in the spreadsheet shown in FIG. 17 is alphabetic data, a "0" is set for the item color code 23a. The data for the first and second column in the second line are also alphabetical character data, therefore a "0" is set for the item color code 23a.

Since the data for the third and fourth columns in the second line indicate "0.0%," a "1" is set for the item color code 23a, "yellow" is set for the color data, and a "3" is set for the gradation data. The data for the fifth column indicates "94.3%," a "1" is set for the item color code 23a, "green" is set for the color data, and a "6" is set for the gradation data. Hereinafter, the item color code, the color data and the gradation data are set in the same manner for the respective items.

The image data for each item and the image for the background color are developed, for each item, in the print data frame memories 12Y', 12M', 12C' and 12K' at steps S36 to S39, based on the item color code 23a and the color information 23b.

When the development of the image for one page is completed, the printer 13 is instructed to print the image on a sheet at step S43. Accordingly, the background colors are added to the spreadsheet cell by cell, as shown in FIG. 17.

Figure 18:
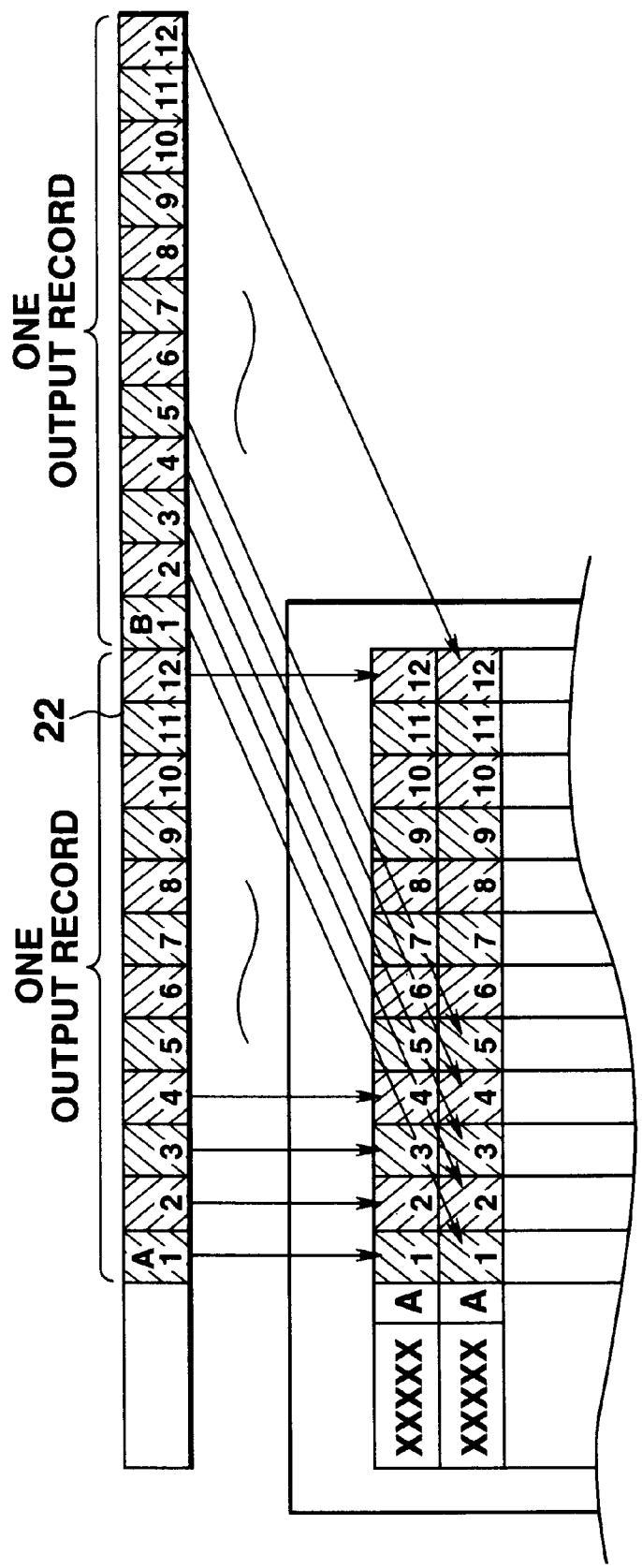
FIG. 18 is a diagram exemplifying the setting of background colors by a plurality of numeric value data items according to the second embodiment.

Although the background colors for each of the cells are set based on the numeric values held in the cells in the second embodiment, the background color for one cell or a plurality of cells may be set based on the numeric data held in a plurality of cells. For example, FIG. 18 shows an example wherein the background colors are set by the two vertically adjoining cells in the spreadsheet based on the calculation result obtained for the values held in the cells. In the same manner, the background colors for two or more adjoining cells may be set in consonance with the calculation result obtained for the values arranged in the cells.

Although the background colors are set line by line or item by item in the embodiment described above, the background colors may be set row by row.

Figure 19:
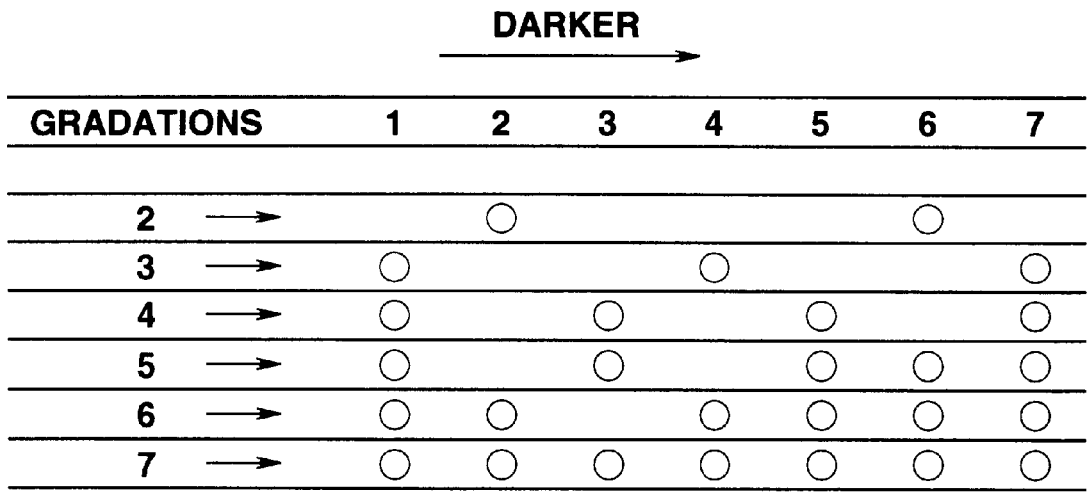
FIG. 19 is a diagram exemplifying the automatic setting of gradations.
Figure 22:
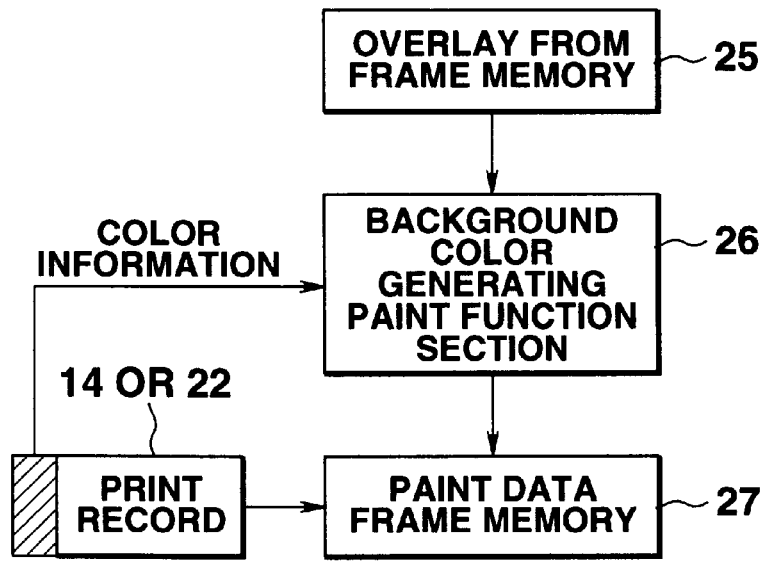
FIG. 22 is a block diagram explaining another example of a method for synthesizing images in a printer control section.

Although the number of gradations is "8" when setting the background colors in the embodiment described above, the number of gradations is not limited to "8." For example, the seven-gradation background color may be converted to two gradations using gradations "2" and "6" for printing, or may be converted to four gradations, using gradations "1," "3," "5" and "7," as shown in FIG. 19.

Figure 20:
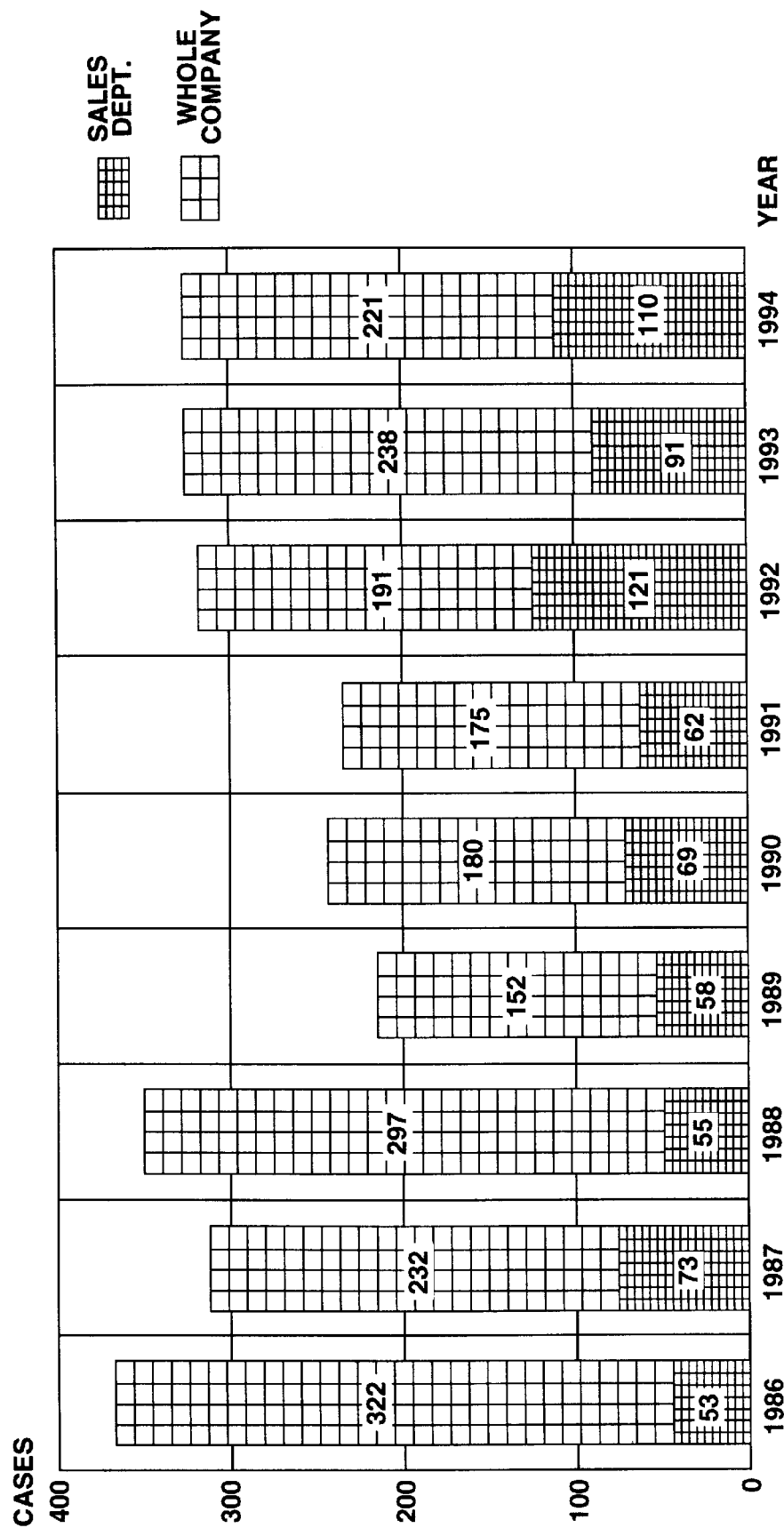
FIG. 20 is a bar graph whose background colors are set by described numeric values according to other embodiment of the present invention.
Figure 21:
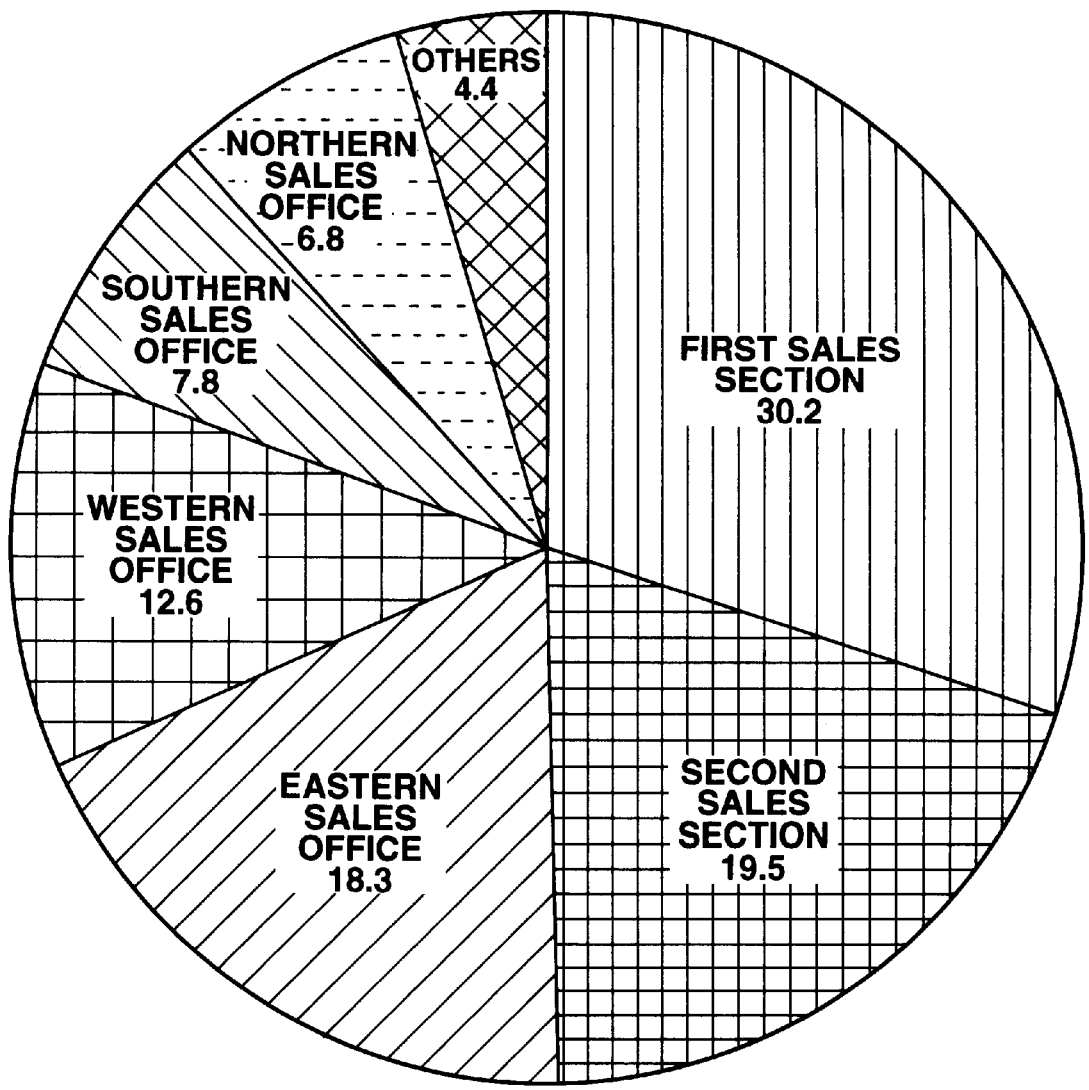
FIG. 21 is a circle graph whose background colors are set by a described numeric value according to other embodiment of the present invention.

Although the background colors are added to the spreadsheet in the above described embodiment, the present invention may be so adapted that the background colors are added to an arbitrary table, a graph such as a bar graph, or a circle graph. For example, the background colors may be set in accordance with the numeric values described in each bar of a bar graph, as shown in FIG. 20, or the background colors may be set in accordance with the numeric values arranged in a circle, as shown in FIG. 21.

In this case, area information, for designating closed areas corresponding to a bar graph or a circle graph, is stored as information for designating areas where background colors will be added, in the form storage area 11. Selection of a background color is decided by comparing characters in each closed area with a numeric value range set in the defining information, and is added to the area determined by the area information. Then the graph, to which the background color is added, is printed.

Although the present invention is adapted for use with a color printer in the embodiment described above, any patterns may be printed in the closed area, for example, based on the numeric value arranged in the closed area. Therefore, the present invention can be adapted for the monochrome printing.

Although the background color (or the pattern) is added to the closed area only when the data arranged in the closed area are the numeral character data in the embodiment described above, the present invention is not thereby limited. For example, the background colors or the kinds of patterns may be decided according to the characters, such as the alphabetic or the type of characters. For example, the background color (or pattern) image may be added in accordance with the types of characters. When the head character is any one of A to D, blue may be set as the background color. When the head character is any one of E to H, green may be set as the background color. And when the head character is any one of I to L, red may be set as the background color. In this case, these examples can be accomplished by determining whether the value of the character code falls within the range of the values set in the defining information. The background colors may be set in accordance with the types of characters (whether numeric or alphabet characters). These examples can be achieved by comparing the value of the numeric character code with the numeric value range set in the defining information. The background colors may be set based on the type of characters set in the closed area. Although the present invention is adapted for use with a printer, the present invention can be adapted for use with every output apparatus that is capable of outputting an image. For example, the present invention can be adapted for use with a display device for displaying a document where background colors are automatically added.

According to the above described embodiment, the image of the spreadsheet form is developed in the overlay form frame memories 12Y, 12M, 12C and 12K, the image of the print data and the background colors are developed in the print data frame memories 12Y', 12M', 12C' and 12K', and the OR circuit 16 synthesizes these images. However, the method for developing and synthesizing the spreadsheet form image, the print data image, and the background color image is not limited to the one described above.

For example, the background color generating section 26 reads the spreadsheet form developed in the overlay frame memory 25 and develops the image, overlaying the spreadsheet form that is read with the background color, in the print data frame memory 27. Then, the print data 14 may be overlaid on the data frame memory 27.

Figure 23A:
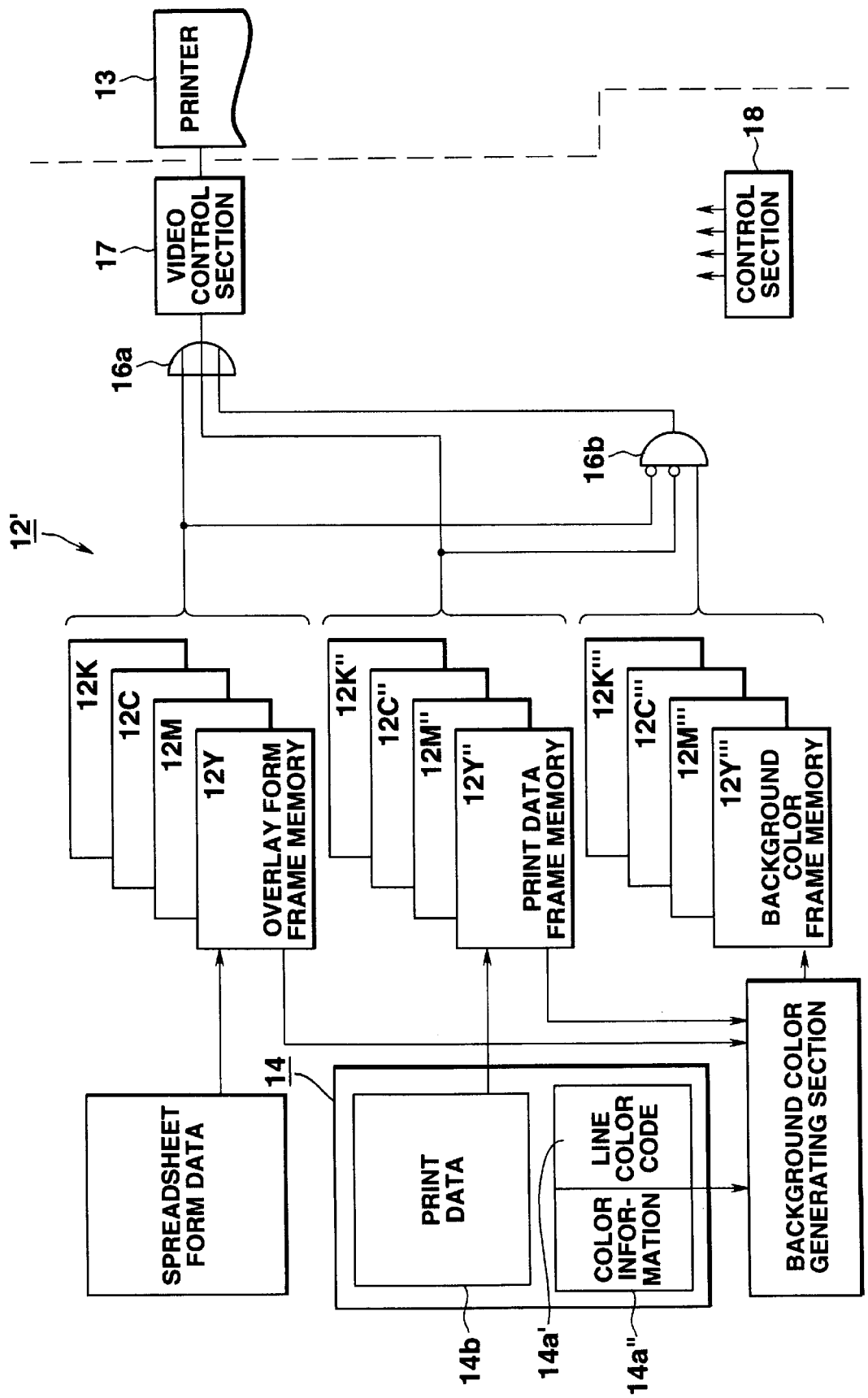
FIG. 23A is a block diagram explaining another example of a method for synthesizing images in a printer control section.

As shown in FIG. 23A, the printer control section 12 may be comprised of overlay frame memories 12Y, 12M, 12C and 12K, in which the spreadsheet form image is to be developed; data frame memories 12Y", 12M", 12C" and 12K", in which the print data image is to be developed; and background color data frame memories 12Y'", 12M'", 12C'" and 12K'", in which the background color image is to be developed. And the OR circuit 16 may obtain the disjunctions (ORs) of the outputs from these frame memories and may synthesize the images.

In FIG. 23A, when a "1" is output from the overlay form frame memories 12Y, 12M, 12C and 12K, or from the background color data frame memories 12Y", 12M", 12C" and 12K", an AND circuit 16b closes. Therefore, the image in the background color data frame memories 12Y'", 12M'", 12C'" and 12K'" are not output to an OR circuit 16a at these coordinates. Accordingly, the amount of toner that is used for printing can be reduced. If the background color image is darker than the print data image, the print data image can be seen clearly.

Figure 23B:
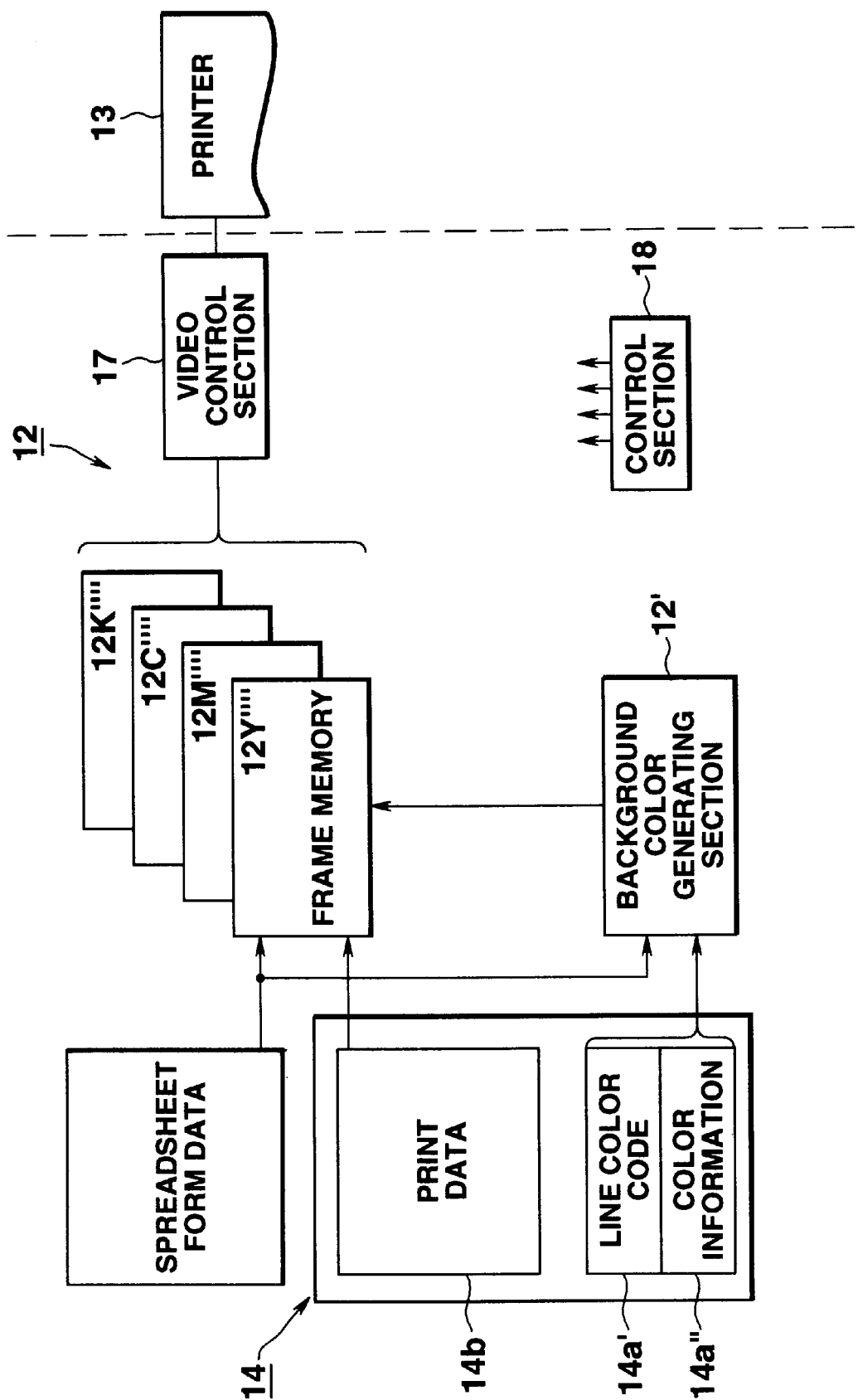
FIG. 23B is a block diagram explaining another example of a method for synthesizing images in a printer control section.

As shown in FIG. 23B, all of the spreadsheet form image, the print data image, and the background data image may be developed in the same frame memories 12Y"", 12M"", 12C"" and 12K"". Thus, the present invention requires a smaller memory capacity.

Third Embodiment

Although the first and second embodiment exemplified the case where the background colors and/or the patterns are automatically added to a part of a sheet according to the image to be printed, an arbitrary tint block may be printed across an entire sheet.

A printer that can print the tint block will now be described.

Figures 28, 29:
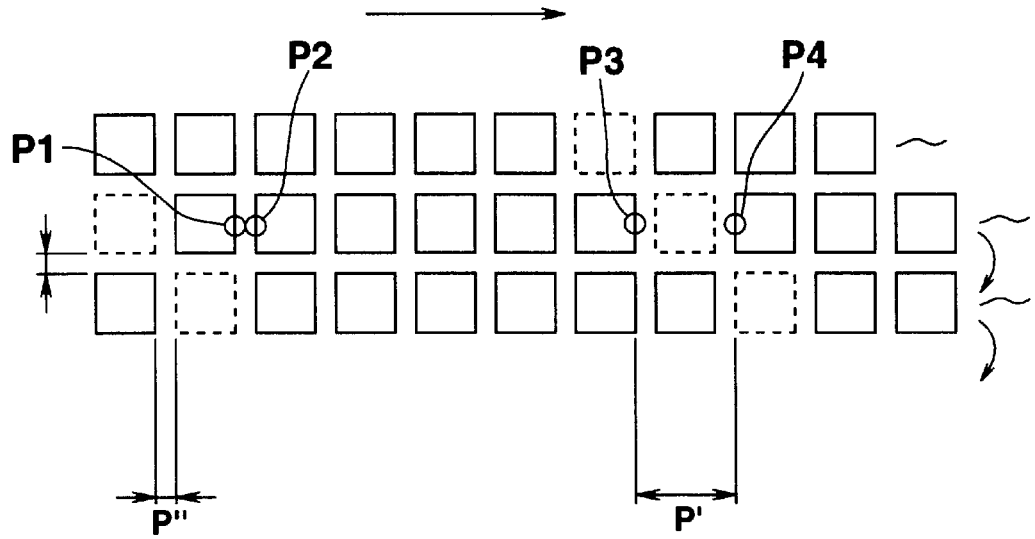
FIG. 28 is a diagram for explaining the size of a tint block.
FIG. 29 is a diagram exemplifying unit character strings wherein "WORLD BANK" is developed in an overlay frame memory.

The tint block is an image expressed by, for example, strings of characters, symbols, numerals or the like, and is to be printed repeatedly to make a tint (or a background image) of a document, a check or the like. Real data, which constitute an image to be printed, are printed on the tint blocks. FIG. 29 shows an example of the tint block. In this embodiment, the characters "WORLD BANK" are printed repeatedly and are shifted line by line. Real data will be printed in the tint block.

Figure 24:
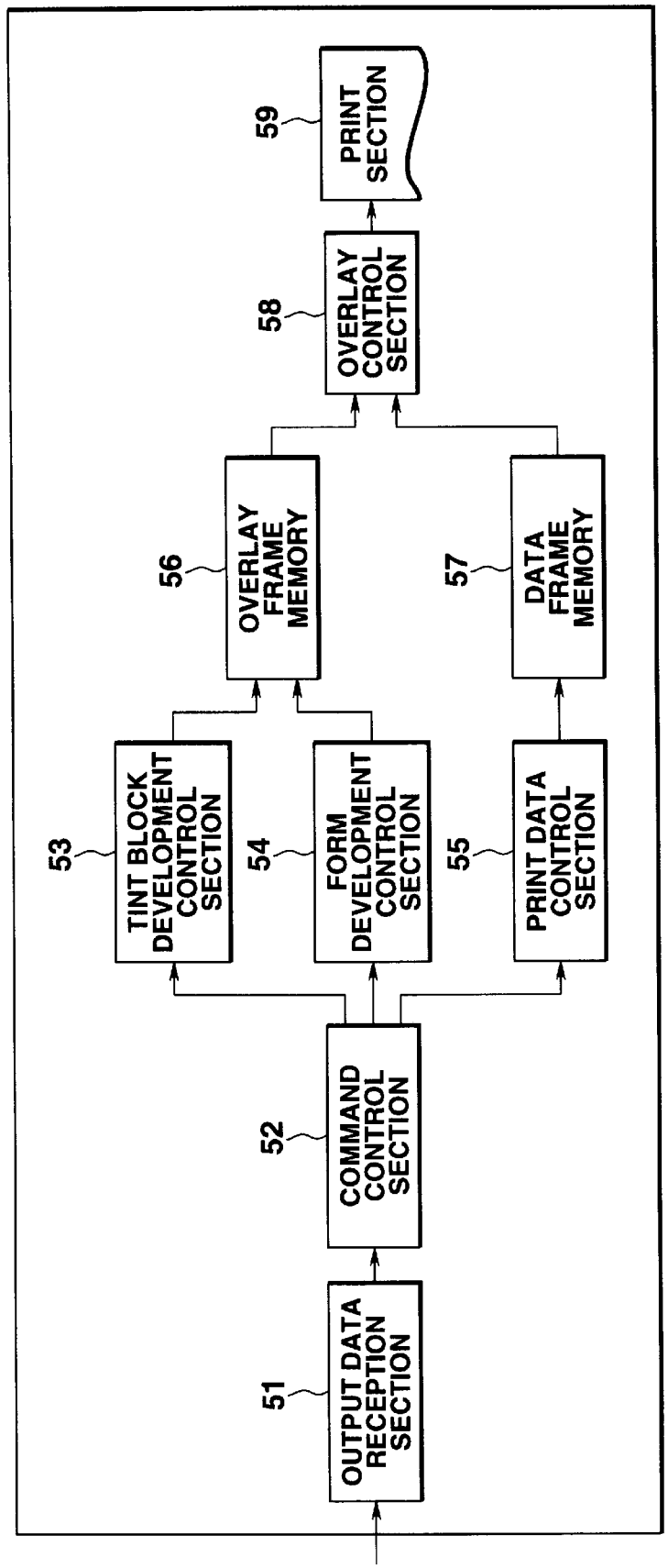
FIG. 24 is a block diagram showing the structure of a printer according to the third embodiment of the present invention.

FIG. 24 is a block diagram showing the system structure of a printer for printing image data and tint blocks. As illustrated, the printer comprises an output data reception section 51, a command control section 52, a tint block development control section 53, a form development control section 54, a print data control section 55, an overlay frame memory 56, a data frame memory 57, an overlay control section 58 and a printer 59.

The output data reception section 51 receives print information output by an unillustrated computer, or the like. The print information includes form data; commands; data which are to be overlaid on the form data such as code data for alphanumeric characters and symbols to be written in the form data; and tint block data. The output data reception section 51 outputs the received print information to the command control section 52. The tint block data includes unit character information for instructing a unit character string in the tint block, development pattern selection information for instructing an arrangement pattern of characters, and color designation information for designating the color of the tint block.

The command control section 52 analyzes commands in the print information, and executes the process instructed by the command. The command control section 52 converts the code data into dot pattern data, and outputs the converted data. If the input print information is the tint block data, the command control section 52 outputs the print information to the tint block data development section 53. If the input print information is the form data, the command control section 52 outputs the print information to the form development section 54. If the input print information is the print data, the command control section 52 outputs the print information to the print data control section 55.

The tint block data development control section 53 has a tint block information memory therein, and stores in the tint block information memory the tint block data supplied from the command control section 52. A plurality of arrangement patterns for the tint block shown in FIGS. 27A to 27E is previously stored in the tint block data development control section 53. The unit character string, instructed by the unit character information registered in the tint block information memory, is developed in the overlay frame memory 56 with the pattern selected by the development pattern selection information, and with a color in accordance with the color designation information. Thus, a continuous tint block pattern can be generated.

Unit information (tint block development text) for the tint block to be printed repeatedly with the predetermined pattern is stored in the unit tint block information memory in the tint block data development control section 53. The tint block data development control section 53 develops a continuous pattern of the tint block into the overlay frame memory 56 in accordance with the unit information registered in the unit tint block information memory.

The form development control section 54 prepares forms for tables or for diagrams based on the form data.

The print data control section 55 develops the image data (real data) to be printed in the tint block in the data frame memory 57.

In the overlay frame memory 56, the tint block data is developed repeatedly by the tint block data development control section 53, and the form data is developed by the form development control section 54. The print data is developed in the data frame memory 57 by the print data control section 55.

The memory capacities of each of the overlay frame memory 56 and the data frame memory 57 are sufficient for the development of the image of the print data for one page of a sheet, for example. The overlay frame memory 56 and the data frame memory 57 have areas for storing bit map patterns for the images having yellow (Y), magenta (M) and cyan (C) components for color printing based on the subtractive color mixture principle, and the black (K) component for monochrome printing.

An operation of the printer will now be described.

FIG. 25 is a diagram for explaining the print process for printing a tint block.

To print the image data having the tint block, designation of tint block printing 62 is sent to a printer 61 by a host computer 60. A user may make this designation using the keys on the printer 61. The printer 61 prepares the pattern for the tint block in the overlay frame memory 56.

If there are form data, the form data are output as form information 63 to the printer 61. The printer 61 develops the tint block and the form data in the overlay frame memory 56, and synthesizes the image for the tint block and the image for the form data.

Then, image data, that is, output information 64 output by an application program to be used in the host computer 60, are output to the printer 61, and the real data is developed in the data frame memory 57.

The overlay control section 58 synthesizes the synthesized image that is developed in the overlay form memory 56, and the image for the real data that is developed in the data frame memory 57. The printer 61 prints the synthesized image on a sheet.

Figure 26:
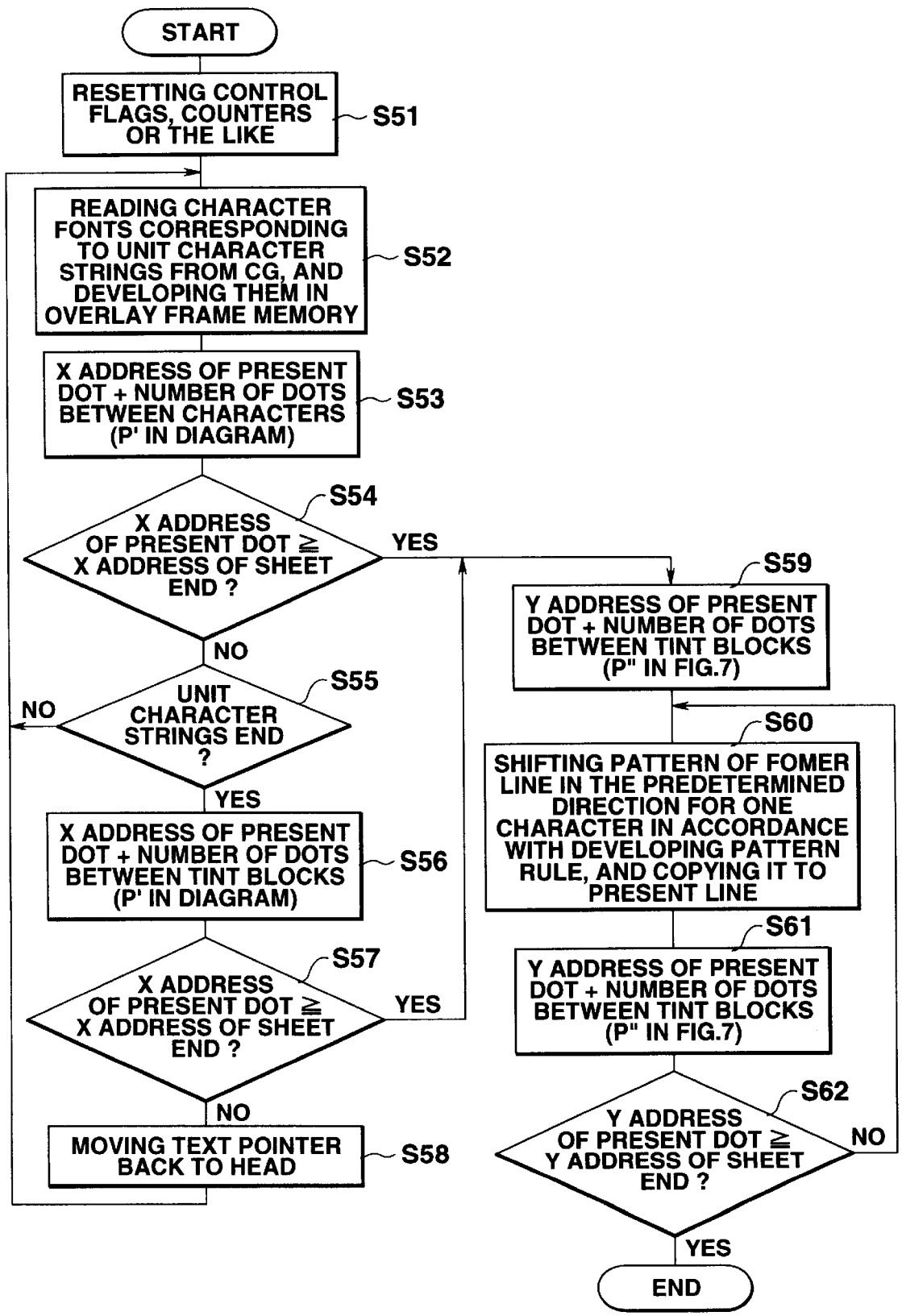
FIG. 26 is a flowchart showing the process for developing a tint block pattern into an overlay frame memory.

The operation of the printer will now be described concretely while referring to a flowchart. FIG. 26 is a flowchart showing the processing where by the tint block print pattern is written in the overlay frame memory.

When the host computer 60 instructs the printing of the tint block, any control flags and counters that are in use, are reset (S51).

Then, the unit character string stored in the tint block information memory is read, and character font data corresponding to the unit character string that is read are read from character generator (CG). And the character font data is developed in the overlay frame memory 56 (S52).

The unit character information, the development pattern selection information, and the color designation information are set in the tint block data previously.

The unit character information comprises unit characters such as "WORLD BANK."

The development pattern selection information is information for selecting an address to prepare any development patterns shown in FIGS. 27A to 27E, for example.

Figure 27A:
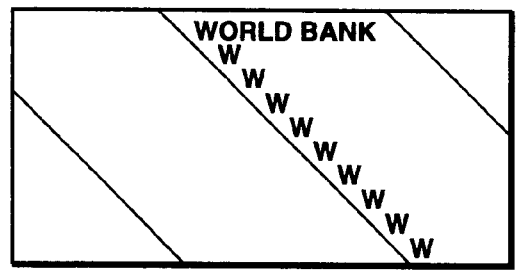
FIGS. 27A through 27E are diagrams showing examples for developing a tint block.
Figure 27B:
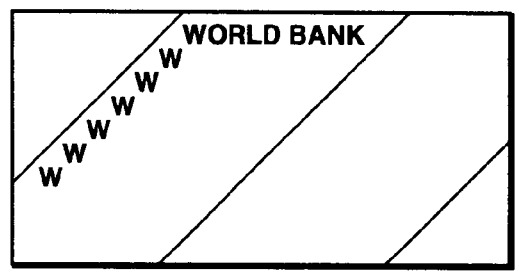
Figure 27C:
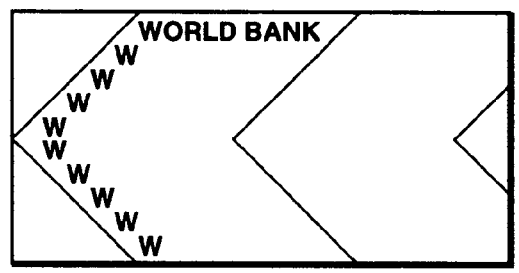
Figure 27D:
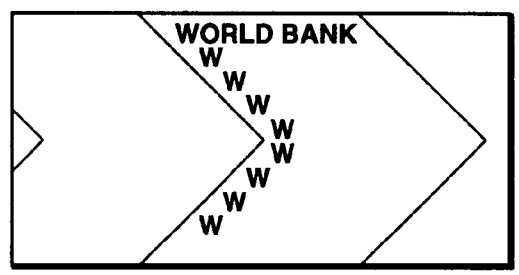
Figure 27E:
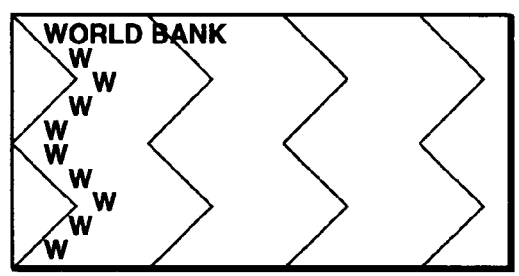

In this embodiment, the tint block development control section 53 develops the unit character "WORLD BANK" with the development pattern shown in FIG. 27A at step S52, which is described later.

The character pattern "WORLD BANK" is read from the CG, responding to the designation of the unit tint block print text information, and is developed in the overlay frame memory 56.

Then, the number of dots between characters are added to address X of the present dot (S53). The address X of the present dot is a point position indicated by a current pointer in a horizontal direction (direction X when the memory area in the overlay frame memory 56 is expressed by an X-Y axis) in the overlay frame memory 56.

It is determined whether address X of the present dot is greater than address X at the end of the sheet (S54).

The process at steps S53 and S54 will now be described while referring to FIG. 28. The pointer is located at position P1 initially. The pointer is shifted to position P2 by adding P1 to the number of dots between characters. The position P2 that is indicated by the pointer is the address X for the present dot. It is determined that the address X for the present dot is not equal to nor greater than the address X at the end of the sheet.

If it is determined that the address X of the present dot is not equal to nor greater than the address X at the end of a sheet at step S54, it is the determined whether or not the development of the unit character string has been completed (S55). If the development of the unit character string has not been completed, program control returns to step S52 to change the text pointer used for indicating characters to be developed, and the next character in the unit character string is developed. If it is determined at step S55 that the development of the unit character string has been completed, the number of dots between tint blocks (intervals between the unit character strings) is added to the address X for the present dot (S56). Furthermore, it is determined whether the address X for the present dot is equal to or greater than the address X at the end of a sheet (S57).

The process at steps S56 and S57 will now be described while referring to FIG. 28. The address X at the present dot is the position P3 indicated by the pointer. P', which indicates the number of dots between the unit characters are added to the position P3. The pointer indicates the position P4, which is the address X for the present dot. It is determined that the address X for the present dot is not equal to or greater than address X at the end of the sheet.

If it is determined at step S57 that the address X for the present dot is not equal to or greater than the address X at the end of a sheet, the tint block data development control section 53 moves the text pointer back to the head to again generate the character pattern for the unit character string to develop (S58). And program control returns to step S52 to develop the text data beginning at the head.

The process described above is performed repeatedly. When the same development pattern for one line is prepared, it is determined at step S57 that the address X for the present dot is equal to or greater than the address X at the end of a sheet. That is, the development pattern for one line is prepared. And the number of dots between characters are added to the address Y for present dot for preparing the same tint block pattern on the next line (S59).

The process at step S59 will now be described while referring to the example shown in FIG. 28. P", the number of dots between characters, in the vertical direction (direction Y in an X-Y axis expression) is added to the address Y of the present dot (S59).

The development pattern for one line, prepared by the process described above, is shifted, and the development pattern is copied as is, for example, for one character in the right direction (a character at the end of the line is shifted to the head of the next line) (S60). Thus, a development pattern shifted (rotated) opposite to the development pattern in a previous line can be prepared. Then, the number of dots between characters are added to the address Y for the present dot (S61), and it is determined that whether the address Y for the present dot is equal to or greater than the address Y at the end of a sheet (S62). While the result is "NO," the steps S60 to S62 are performed repeatedly to write the shifted (rotated) patterns, the same as the pattern for the previous line on the overlay frame memory 56. If it is determined that the address Y for the present dot is equal to or greater than the address Y at the end of a sheet, the process is completed.

According to the process described above, the tint block data can be easily developed in the overlay frame memory 56. FIG. 29 shows an example wherein the unit character string "WORLD BANK" is developed in the overlay frame memory 56 using the development pattern shown in FIG. 27A in consonance with the process described above.

While the tint block data is developed in the overlay frame memory 56, the form development control section 54 develops the form data in the overlay frame memory 56. Thus, the tint block is overlaid on the form in the overlay frame memory 56. After the tint block data is developed in the overlay frame memory 56, the form data may be overwritten.

After the tint block data and the form data are developed in the overlay frame memory 56, the output information 64 (image data) for the application software is output to the printer 61 by the host computer 60. That is, the image data output to the printer 61 via the output data reception section 51 are once memorized in a reception buffer. The command control section 52 converts the character code in the image data into dot pattern data, and develops the converted data in the data frame memory 57 in accordance with the command. Thus, the bit map data for one page of a sheet are developed in the data frame memory 57.

Figure 30:
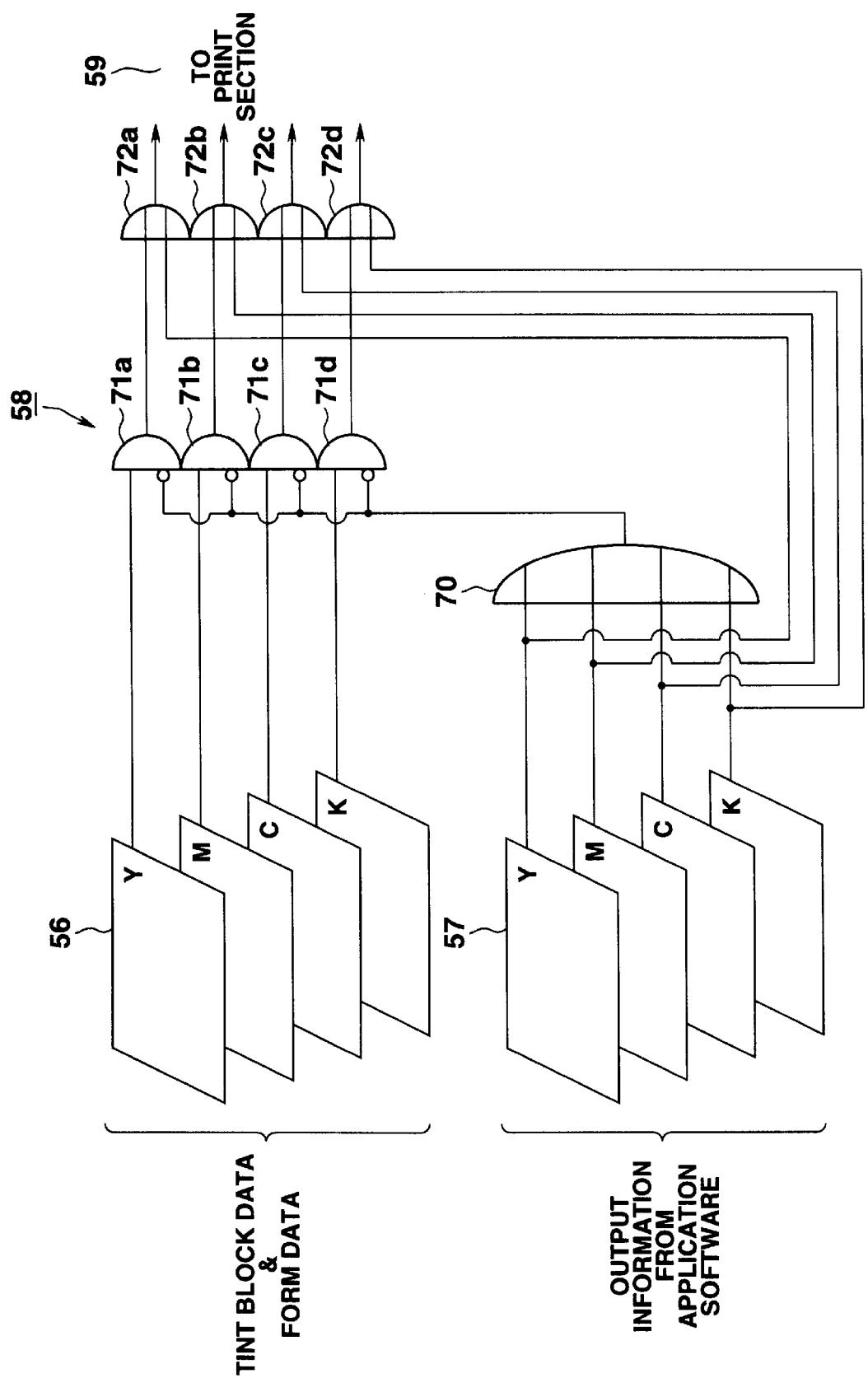
FIG. 30 is a block diagram showing the structure of an overlay control section.

FIG. 30 shows a circuit for the overlay control section 58.

Each of the overlay frame memory 56 and the data frame memory 57 comprises storage areas for yellow (Y), magenta (M), cyan (C) and black (K), and images are to be developed, color by color. Data for each colors are output to the printer 59 via the overlay control section 58.

As illustrated, the output from the data frame memory 57 is input to an OR gate 70, color by color. If at least one of the colors yellow (Y), magenta (M), cyan (C) and black (K) has a high level output signal, the OR gate 70 has a high level output signal.

The AND gate 71a obtains the conjunctions (ANDs) of the output from the overlay frame memory 56 for yellow (Y) and the negation of the output from the OR gate 70. The AND gates 71b to 71d obtain conjunctions (ANDs) of the outputs in the same manner. If the image is developed in the data frame memory 57, the output from AND gates 71a to 71d is low. The OR gate 72a obtains disjunctions (ORs) of the output from the AND gate 71a and the output from the data frame memory 57. The OR gates 72b to 72d obtain disjunctions (ORs) of the outputs in the same manner. Therefore, only the image data is provided to the printer 59 if the image is developed in the data frame memory 57.

Figure 31:
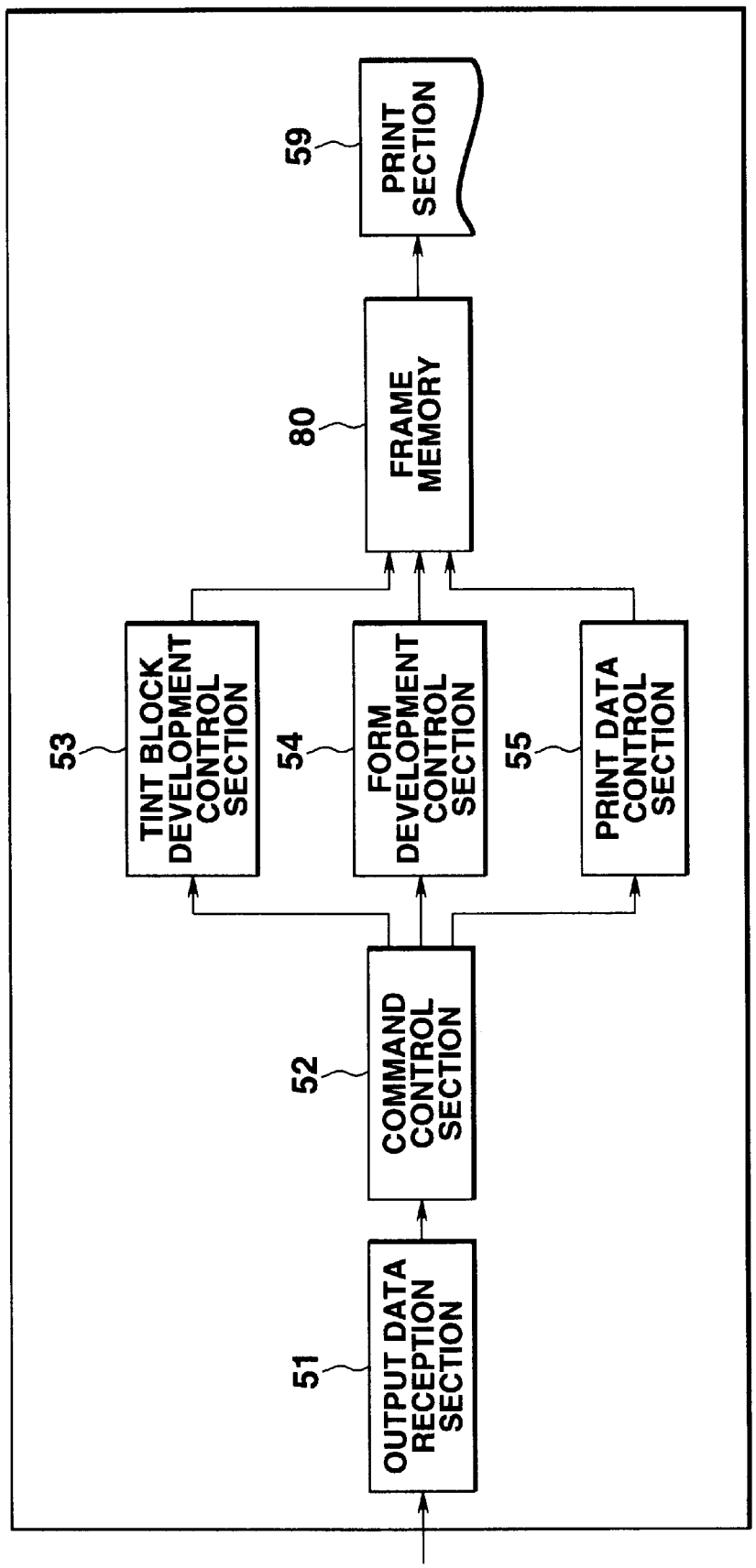
FIG. 31 is a block diagram showing another structure of a printer according to the third embodiment.

The method for developing the tint block data, the form data and the image data in the frame memory is not limited to the embodiment described above. For example, as shown in FIG. 31, the tint block data development control section 53 may develop the tint block data in the frame memory 70, the form development control section 54 may develop form data in the frame memory 70, and the print data control section 54 may develop the real data in the frame memory 70. All of the data may be developed in different frame memories, as illustrated for the printer shown in FIG. 23A.

When the background image is added to an aforementioned frame of the spreadsheet form, the tint block pattern described in this embodiment may be used as the background image.

What is claimed is:

1. An image forming system adapted for use with a host computer and a printer, said host computer producing frame image defining information and in-frame document information while at a same time executing document information producing software, and said printer producing an in-frame document image corresponding to said in-frame document information and a frame image corresponding to said frame image defining information and synthesizing the produced images with each other to print out a synthesized image on a recording medium, said image forming system comprising:

discriminating condition setting means for previously setting a discrimination condition used to discriminate peculiarities of said in-frame document information;

discriminating means for discriminating the peculiarities of said in-frame document information which is to be printed within a predetermined frame of said frame image in a synthesized manner by said printer based upon said discrimination condition;

background image data generating means for generating background image data corresponding to the peculiarities of said in-frame document information discriminated by said discriminating means;

frame image data generating means for generating frame image data based upon said frame image defining information;

in-frame document image data generating means for generating in-frame document image data corresponding to said in-frame document information;

synthesized-image data generating means for synthesizing said frame image data with said in-frame document image data in combination with said background image data with respect to said predetermined frame to thereby produce a background image within a region of said predetermined frame; and control means for controlling said printer to print out on said recording medium an image synthesized from said frame image, said in-frame document image, and said background image.

2. The image forming system according to claim 1, wherein said synthesized image-data generating means comprises an image memory in which the frame image data generated by said frame image data generating means, the in-frame document image data generated by said in-frame document image data generating means, and the background image data generated by said background image data generating means are to be developed.

3. The image forming system according to claim 1, wherein said synthesized-image data generating means comprises:

a first image memory in which the frame image data generated by said frame image data generating means is to be developed;

a second image memory in which the in-frame document image data generated by said in-frame document image data generating means and the background image data generated by said background image data generating means are to be developed; and image data synthesizing means for synthesizing images developed in said first and second image memories.

4. The image forming system according to claim 1, wherein said synthesized-image data generating means comprises:

a first image memory in which the frame image data generated by said frame image data generating means is to be developed;

a second image memory in which the in-frame document image data generated by said in-frame document image data generating means is to be developed;

a third image memory in which the background image data generated by said background image data generating means is to be developed; and image synthesizing means for synthesizing images developed in said first, second and third image memories.

5. The image forming system according to claim 1, said image synthesizing means further comprising means for not synthesizing the background image data where at least one of the frame image data and the in-frame document image data are to be written.

6. The image forming system according to claim 1, wherein the in-frame document information comprises numerical character data, and said discriminating means includes means for discriminating a numeric value range defined by said discriminating condition setting means to which a numeric value indicated by the in-frame document information belongs.

7. The image forming system according to claim 6, wherein said background image data generating means comprises means for storing a plurality of pieces of background image data corresponding to the numeric value ranges defined by said discriminating condition setting means.

8. The image forming system according to claim 7, wherein the plurality of pieces of background image data define colors which are selected based on the numeric value ranges and which are different from each other.

9. The image forming system according to claim 7, wherein the plurality of pieces of background image data define patterns which are selected based on the numeric value ranges and which are different from each other.

10. The image forming system according to claim 7, wherein the plurality of pieces of background image data define gradations which are selected based on the numeric value ranges and which are different from each other.

11. An image forming method comprising the steps of:

(a) previously producing document information including information for defining a framework of a table and numeral information to be written into said table;

(b) setting a discriminating condition used to discriminate said numeral information;

(c) designating at least one specific frame within said table;

(d) designating an influence region of a plurality of frames including said at least one specific frame;

(e) receiving said numeral information and said table framework defining information;

(f) discriminating said numeral information to be written into said at least one specific frame based upon said discriminating condition;

(g) producing background image data in response to a discriminating result;

(h) producing image data based on both said numeral information and said table framework defining information;

(i) synthesizing said background image data with said image data and developing a synthesized image on a region of an image memory corresponding to said influence region; and (j) printing out on a recording medium said synthesized image.

12. The image forming method according to claim 11, wherein said table includes a plurality of frames arranged in a matrix, said at least one specific frame comprises one frame in the table, and said influence region comprises said specific frame.

13. The image forming method according to claim 11, wherein said table includes a plurality of frames arranged in a matrix having rows and columns, said at least one specific frame comprises one frame in a predetermined row and a predetermined column, and said influence region comprises one of the predetermined row and the predetermined column.

14. The image forming method according to claim 11, wherein:

said table includes a plurality of frames arranged in a matrix having rows and columns;

said specific frame comprises a plurality of specified frames in one of a predetermined row and a predetermined column;

said background data is determined in accordance with a value which is obtained by a calculation of values indicated by numeral characters in the plurality of specified frames; and said influence region comprises the one of the predetermined row and the predetermined column in which the plurality of specified frames are located.

* * * * *